United States Patent
Xu et al.

(10) Patent No.: US 11,281,886 B2
(45) Date of Patent: Mar. 22, 2022

(54) FINGERPRINT ENROLLMENT METHOD AND TERMINAL

(71) Applicant: Huawei Technologies Co., Ltd., Shenzhen (CN)

(72) Inventors: Jie Xu, Shanghai (CN); Yun Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/969,247

(22) PCT Filed: Feb. 12, 2018

(86) PCT No.: PCT/CN2018/076575
§ 371 (c)(1),
(2) Date: Aug. 12, 2020

(87) PCT Pub. No.: WO2019/153362
PCT Pub. Date: Aug. 15, 2019

(65) Prior Publication Data
US 2021/0004561 A1 Jan. 7, 2021

(51) Int. Cl.
*G06K 9/00* (2006.01)
*G06F 3/01* (2006.01)
*G06F 3/041* (2006.01)

(52) U.S. Cl.
CPC ......... *G06K 9/00087* (2013.01); *G06F 3/016* (2013.01); *G06F 3/0414* (2013.01); *G06K 9/00919* (2013.01); *G06K 9/00926* (2013.01)

(58) Field of Classification Search
CPC ........... G06K 9/00087; G06K 9/00919; G06K 9/00926; G06K 9/00013; G06K 9/6253; G06K 9/0004; G06F 3/016; G06F 3/0414
See application file for complete search history.

(56) References Cited

U.S. PATENT DOCUMENTS

| 7,583,754 B2 | 9/2009 | Liu |
| 2012/0300988 A1 | 11/2012 | Ivanov et al. |
| 2015/0235098 A1* | 8/2015 | Lee ..................... G06K 9/0002 715/709 |
| 2015/0294131 A1 | 10/2015 | Neskovic et al. |

(Continued)

FOREIGN PATENT DOCUMENTS

| CN | 1423790 A | 6/2003 |
| CN | 1689295 A | 10/2005 |

(Continued)

*Primary Examiner* — Abhishek Sarma
(74) *Attorney, Agent, or Firm* — Conley Rose, P.C.

(57) ABSTRACT

A fingerprint enrollment method and a device related to the field of terminals includes receiving, by a terminal, a first input of a user, displaying, in response to the first input, a fingerprint enrollment interface, displaying at least two fingerprint patterns in the fingerprint enrollment interface, instructing the user to touch a displayed fingerprint pattern, and when the user touches a display position of the fingerprint pattern, enrolling fingerprint information of the user, where each of the at least two fingerprint patterns at least partially overlaps a fingerprint collection area of the touchscreen, and different fingerprint patterns have different overlapping areas with the fingerprint collection area.

20 Claims, 35 Drawing Sheets

(56) References Cited

U.S. PATENT DOCUMENTS

| | | | |
|---|---|---|---|
| 2017/0004295 A1 | 1/2017 | Kim et al. | |
| 2018/0277065 A1 | 9/2018 | Zuo et al. | |
| 2018/0373917 A1* | 12/2018 | Sheik-Nainar | G06K 9/00912 |

FOREIGN PATENT DOCUMENTS

| | | | |
|---|---|---|---|
| CN | 101086766 A | 12/2007 | |
| CN | 101373516 A | 2/2009 | |
| CN | 105051753 A | 11/2015 | |
| CN | 105184218 A | 12/2015 | |
| CN | 105760838 A | 7/2016 | |
| CN | 105809122 A | 7/2016 | |
| CN | 106033536 A | 10/2016 | |
| CN | 106326327 A | 1/2017 | |
| CN | 107025041 A | 8/2017 | |
| CN | 107111763 A | 8/2017 | |
| CN | 107329688 A | 11/2017 | |
| JP | H06325158 A | 11/1994 | |
| JP | H1131218 A | 2/1999 | |

* cited by examiner

FINGERPRINT ENROLLMENT METHOD AND TERMINAL

CROSS-REFERENCE TO RELATED APPLICATIONS

This application is a U.S. National Stage of International Patent Application No. PCT/CN2018/076575 filed on Feb. 12, 2018, which is hereby incorporated by reference in its entirety.

TECHNICAL FIELD

Embodiments of this application relate to the field of terminals, and in particular, to a fingerprint enrollment method and a terminal.

BACKGROUND

As an identity authentication technology based on biometric features, a fingerprint recognition technology has been widely applied to terminals. Currently, more fingerprint information on one finger of a user is enrolled into a terminal in advance, to ensure fingerprint recognition accuracy.

In the prior art, in a fingerprint enrollment process, the terminal may display a text or visual effect to prompt a user to change a hold posture to enroll a fingerprint, or interrupt a user to notify that the user needs to change a hold posture to enroll a fingerprint, to enroll more fingerprint information on one finger.

For example, the terminal is a mobile phone. For example, a user clicks a setting icon. In response to the click operation performed by the user on the setting icon, as shown in (a) in FIG. 1, a mobile phone displays a home screen 101 for setting an application, and the user selects a fingerprint and password option 102 in the home screen 101. In response to the selection operation performed by the user on the fingerprint and password option 102, as shown in (b) in FIG. 1, the mobile phone enters a fingerprint and password setting interface 103, and the user selects an add fingerprint option 104 in the fingerprint and password setting interface 103. In response to the selection operation performed by the user on the add fingerprint option 104, as shown in (c) in FIG. 1, the mobile phone enters a fingerprint enrollment interface 105. After the mobile phone enters the fingerprint enrollment interface 105, the user may enroll a fingerprint based on a prompt. For example, based on prompt information 106 shown in (c) in FIG. 1, the user can enroll a fingerprint by placing a finger on a home screen button 107.

In a process in which the user enrolls the fingerprint, as shown in (a) in FIG. 2, the mobile phone may display a text prompt 201 and a visual effect 202, or as shown in (b) in FIG. 2, the mobile phone may interrupt the user when the user is enrolling the fingerprint, and display a prompt interface 203, to prompt the user that a hold posture needs to be adjusted, thereby facilitating enrolling more fingerprint information of the user into the mobile phone. It may be obtained that, in the prior art, the user may not correctly adjust the hold posture based on an instruction. Consequently, more fingerprint information of the user still cannot be collected after a plurality of times of enrolling, resulting in low fingerprint enrollment quality.

SUMMARY

Embodiments of this application provide a fingerprint enrollment method and a terminal, to resolve a problem of low fingerprint enrollment quality because more fingerprint information of the user still cannot be collected after a plurality of times of enrolling.

To achieve the foregoing objective, the following technical solutions are used in the embodiments of this application:

According to a first aspect of the embodiments of this application, a fingerprint enrollment method is provided, and applied to a terminal, where the terminal may include a touchscreen, and the fingerprint enrollment method may include: receiving a first input of a user; in response to the first input, displaying a fingerprint enrollment interface; and displaying at least two fingerprint patterns in the fingerprint enrollment interface, instructing the user to touch a displayed fingerprint pattern, and when the user touches a display position of the fingerprint pattern, enrolling fingerprint information of the user, where each of the at least two fingerprint patterns at least partially overlaps a fingerprint collection area of the touchscreen, and different fingerprint patterns have different overlapping areas with the fingerprint collection area.

In the fingerprint enrollment method provided in this embodiment of this application, after receiving the first input of the user, the terminal displays the fingerprint enrollment interface in response to the first input, displays, in the fingerprint enrollment interface, the at least two fingerprint patterns that at least partially overlap the fingerprint collection area of the touchscreen of the terminal, and instructs the user to touch the displayed fingerprint pattern. When the user touches the display position of the fingerprint pattern, the fingerprint information of the user is enrolled into the terminal. In addition, in the at least two fingerprint patterns displayed in the fingerprint enrollment interface, different fingerprint patterns have different overlapping areas with the fingerprint collection area. According to the method in this embodiment of this application, display positions of fingerprint patterns dynamically change to instruct the user to touch a fingerprint pattern, each of the dynamically changing fingerprint patterns at least partially overlap the fingerprint collection area of the touchscreen, and different fingerprint patterns have different overlapping areas with the fingerprint collection area. In this way, the user needs to touch only the displayed fingerprint pattern, so that the terminal can obtain fingerprint information at more angles and positions of the user, thereby improving fingerprint enrollment quality. In addition, in a fingerprint enrollment process, enrollment of the user does not need to be interrupted, and user learning is not required, thereby improving user experience.

With reference to the first aspect, in a possible implementation, the fingerprint enrollment method may further include: in response to the touch input of the user at the display position of the fingerprint pattern, or in response to detecting that a fingerprint is successfully enrolled at the display position of the fingerprint pattern, updating the displayed fingerprint pattern.

With reference to the first aspect and the foregoing possible implementation, in another possible implementation, the displaying at least two fingerprint patterns in the fingerprint enrollment interface, instructing the user to touch a displayed fingerprint pattern, and when the user touches a display position of the fingerprint pattern, enrolling fingerprint information of the user may specifically include: displaying, in the fingerprint enrollment interface, a first fingerprint pattern whose center overlaps a center of the fingerprint collection area, instructing the user to touch the displayed first fingerprint pattern, and when the user touches a display position of the first fingerprint pattern, enrolling first fingerprint information of the user; and displaying, in the fingerprint enrollment interface, a second fingerprint pattern whose center does not overlap the center of the fingerprint collection area but that at least partially overlaps the fingerprint collection area, instructing the user to touch the displayed second fingerprint pattern, and when the user touches a display position of the second fingerprint pattern, enrolling second fingerprint information of the user.

With reference to the first aspect and the foregoing possible implementations, in another possible implementation, the display position of the second fingerprint pattern is located on a circular line or a cross line with the fingerprint collection area as a center.

With reference to the first aspect and the foregoing possible implementations, in another possible implementation, the displaying a second fingerprint pattern in the fingerprint enrollment interface may specifically include at least one of the following: if a type of a finger used by the user to touch the fingerprint pattern is a right thumb, displaying the second fingerprint pattern in the fingerprint enrollment interface, where the display position of the second fingerprint pattern is located on a straight line determined based on a bottom right corner and a top left corner of the fingerprint collection area; or if a type of a finger used by the user to touch the fingerprint pattern is a left thumb, displaying the second fingerprint pattern in the fingerprint enrollment interface, where the display position of the second fingerprint pattern is located on a straight line determined based on a top right corner and a bottom left corner of the fingerprint collection area; or if a type of a finger used by the user to touch the fingerprint pattern is an index finger, displaying the second fingerprint pattern in the fingerprint enrollment interface, where the display position of the second fingerprint pattern is located on a vertical line passing through the center of the fingerprint collection area; or if the user touches the fingerprint pattern with a right hand, displaying the second fingerprint pattern in the fingerprint enrollment interface, where the display position of the second fingerprint pattern is located on a left side of a vertical line passing through the center of the fingerprint collection area; or if the user touches the fingerprint pattern with a left hand, displaying the second fingerprint pattern in the fingerprint enrollment interface, where the display position of the second fingerprint pattern is located on a right side of a vertical line passing through the center of the fingerprint collection area. In this way, different types of fingers of the user are distinguished, so that fingerprint patterns are displayed at different positions, thereby further improving fingerprint enrollment quality.

With reference to the first aspect and the foregoing possible implementations, in another possible implementation, the fingerprint enrollment method may further include: determining whether the user touches the fingerprint pattern with a left hand or a right hand; or determining whether the user touches the fingerprint pattern with a left hand or a right hand, and determining whether the type of the finger used by the user to touch the fingerprint pattern is a thumb; or determining whether the type of the finger used by the user to touch the fingerprint pattern is a thumb, and determining whether the user touches the fingerprint pattern with a left hand or a right hand.

With reference to the first aspect and the foregoing possible implementations, in another possible implementation, before the displaying a second fingerprint pattern in the fingerprint enrollment interface, and instructing the user to touch the displayed second fingerprint pattern, the fingerprint enrollment method may further include: determining a position of an unsuccessfully enrolled fingerprint based on the first fingerprint information; and determining the display position of the second fingerprint pattern based on the position of the unsuccessfully enrolled fingerprint. In this way, a part of a fingerprint that is unsuccessfully enrolled is determined based on successfully enrolled fingerprint information, and a display position of a fingerprint pattern is determined based on a position of the unsuccessfully enrolled fingerprint, thereby further improving fingerprint enrollment quality With reference to the first aspect and the foregoing possible implementations, in another possible implementation, the updating the displayed fingerprint pattern may specifically include: if the at least two fingerprint patterns are simultaneously displayed in the fingerprint enrollment interface, no longer displaying a fingerprint pattern touched by the user in the at least two fingerprint patterns, and continuing to display all fingerprint patterns not touched by the user in the at least two fingerprint patterns; or if the at least two fingerprint patterns are sequentially displayed in the fingerprint enrollment interface, no longer displaying a fingerprint pattern currently touched by the user, and displaying a next fingerprint pattern of the fingerprint pattern currently touched by the user.

According to a second aspect of the embodiments of this application, a fingerprint enrollment method is provided, and applied to a terminal, where the terminal includes a touchscreen, and the fingerprint enrollment method may include: receiving, by the terminal, a first input of a user; in response to the received first input, displaying a fingerprint enrollment interface; displaying a first fingerprint pattern in the fingerprint enrollment interface, instructing the user to touch the displayed first fingerprint pattern, and when the user touches a display position of the first fingerprint pattern, enrolling first fingerprint information of the user, where a center of the first fingerprint pattern overlaps a center of a fingerprint collection area of the touchscreen; no longer displaying the first fingerprint pattern, displaying a second fingerprint pattern in the fingerprint enrollment interface, instructing the user to touch the displayed second fingerprint pattern, and when the user touches a display position of the second fingerprint pattern, enrolling second fingerprint information of the user; no longer displaying the second fingerprint pattern, displaying a third fingerprint pattern in the fingerprint enrollment interface, instructing the user to touch the displayed third fingerprint pattern, and when the user touches a display position of the third fingerprint pattern, enrolling third fingerprint information of the user; no longer displaying the third fingerprint pattern, displaying a fourth fingerprint pattern in the fingerprint enrollment interface, instructing the user to touch the displayed fourth fingerprint pattern, and when the user touches a display position of the fourth fingerprint pattern, enrolling fourth fingerprint information of the user; and no longer displaying the fourth fingerprint pattern, displaying a fifth fingerprint pattern in the fingerprint enrollment interface, instructing the user to touch the displayed fifth fingerprint pattern, and when the user touches a display position of the fifth fingerprint pattern, enrolling fifth fingerprint information of the user, where none of centers of the second fingerprint pattern, the third fingerprint pattern, the fourth fingerprint pattern, and the fifth fingerprint pattern overlap a center of the fingerprint collection area, but the second fingerprint pattern, the third fingerprint pattern, the fourth fingerprint pattern, and the fifth fingerprint pattern at least partially overlap the fingerprint collection area, and the second fingerprint pattern, the third fingerprint pattern, the fourth fingerprint pattern, and the fifth fingerprint pattern are sequentially arranged in a clockwise direction on a circular line with the fingerprint collection area as a center.

In the fingerprint enrollment method provided in this embodiment of this application, after receiving the first input of the user, the terminal displays the fingerprint enrollment interface in response to the first input, first displays, in the fingerprint enrollment interface, a fingerprint pattern whose center overlaps the center of the fingerprint collection area, and sequentially displays in the clockwise direction other fingerprint patterns located on the circular line with the fingerprint collection area as the center, to instruct the user to touch a displayed fingerprint pattern. When the user touches a display position of the corresponding fingerprint pattern, fingerprint information of the user at the corresponding position is enrolled into the terminal. According to the method in this embodiment of this application, display positions of fingerprint patterns dynamically change to instruct the user to touch a fingerprint pattern, each of the dynamically changing fingerprint patterns at least partially overlap the fingerprint collection area of the touchscreen, and different fingerprint patterns have different overlapping areas with the fingerprint collection area. In this way, the user needs to touch only the displayed fingerprint pattern, so that the terminal can obtain fingerprint information at more angles and positions of the user, thereby improving fingerprint enrollment quality. In addition, in a fingerprint enrollment process, enrollment of the user does not need to be interrupted, and user learning is not required, thereby improving user experience.

With reference to the first aspect, in a possible implementation, the fingerprint enrollment method may further include: determining a position of an unsuccessfully enrolled fingerprint; and displaying a sixth fingerprint pattern in the fingerprint enrollment interface at a position corresponding to the position of the unsuccessfully enrolled fingerprint, instructing the user to touch the displayed sixth fingerprint pattern, and when the user touches a display position of the sixth fingerprint pattern, enrolling sixth fingerprint information of the user. In this way, a part of a fingerprint that is unsuccessfully enrolled is determined based on successfully enrolled fingerprint information, and based on a position of the unsuccessfully enrolled fingerprint, a fingerprint pattern is displayed at the corresponding position, to instruct the user to touch the displayed fingerprint pattern, thereby further improving fingerprint enrollment quality.

According to a third aspect of the embodiments of this application, a terminal is provided, where the terminal may include an input unit, a display unit, and an enrollment unit, where the input unit is configured to receive a first input of a user; the display unit is configured to: in response to the first input, display a fingerprint enrollment interface, display at least two fingerprint patterns in the fingerprint enrollment interface, and instruct the user to touch a displayed fingerprint pattern; and the enrollment unit is configured to: when the user touches a display position of the fingerprint pattern, enroll fingerprint information of the user, where each of the at least two fingerprint patterns at least partially overlaps a fingerprint collection area of a touchscreen of the terminal, and different fingerprint patterns have different overlapping areas with the fingerprint collection area.

With reference to the third aspect, in a possible implementation, the display unit is further configured to: in response to the touch input of the user at the display position of the fingerprint pattern, or in response to detecting that a fingerprint is successfully enrolled at the display position of the fingerprint pattern, update the displayed fingerprint pattern.

With reference to the third aspect or the foregoing possible implementation, in another possible implementation, the display unit is specifically configured to: display a first fingerprint pattern in the fingerprint enrollment interface, and instruct the user to touch the displayed first fingerprint pattern; the enrollment unit is specifically configured to: when the user touches a display position of the first fingerprint pattern, enroll first fingerprint information of the user, where a center of the first fingerprint pattern overlaps a center of the fingerprint collection area; the display unit is specifically configured to: display a second fingerprint pattern in the fingerprint enrollment interface, and instruct the user to touch the displayed second fingerprint pattern; and the enrollment unit is specifically configured to: when the user touches a display position of the second fingerprint pattern, enroll second fingerprint information of the user, where a center of the second fingerprint pattern does not overlap the center of the fingerprint collection area but the second fingerprint pattern at least partially overlaps the fingerprint collection area.

With reference to the third aspect or the foregoing possible implementations, in another possible implementation, the display position of the second fingerprint pattern is located on a circular line or a cross line with the fingerprint collection area as a center.

With reference to the third aspect or the foregoing possible implementations, in another possible implementation, the display unit is specifically configured to: if a type of a finger used by the user to touch the fingerprint pattern is a right thumb, display the second fingerprint pattern in the fingerprint enrollment interface, where the display position of the second fingerprint pattern is located on a straight line determined based on a bottom right corner and a top left corner of the fingerprint collection area; or if a type of a finger used by the user to touch the fingerprint pattern is a left thumb, display the second fingerprint pattern in the fingerprint enrollment interface, where the display position of the second fingerprint pattern is located on a straight line determined based on a top right corner and a bottom left corner of the fingerprint collection area; or if a type of a finger used by the user to touch the fingerprint pattern is an index finger, display the second fingerprint pattern in the fingerprint enrollment interface, where the display position of the second fingerprint pattern is located on a vertical line passing through the center of the fingerprint collection area; or if the user touches the fingerprint pattern with a right hand, display the second fingerprint pattern in the fingerprint enrollment interface, where the display position of the second fingerprint pattern is located on a left side of a vertical line passing through the center of the fingerprint collection area; or if the user touches the fingerprint pattern with a left hand, display the second fingerprint pattern in the fingerprint enrollment interface, where the display position of the second fingerprint pattern is located on a right side of a vertical line passing through the center of the fingerprint collection area.

With reference to the third aspect or the foregoing possible implementations, in another possible implementation, the terminal may further include a determining unit, configured to: determine whether the user touches the fingerprint pattern with a left hand or a right hand; or determine whether the user touches the fingerprint pattern with a left hand or a right hand, and determine whether the type of the finger used by the user to touch the fingerprint pattern is a thumb; or determine whether the type of the finger used by the user to touch the fingerprint pattern is a thumb, and determine whether the user touches the fingerprint pattern with a left hand or a right hand.

With reference to the third aspect or the foregoing possible implementations, in another possible implementation, the terminal may further include a determining unit, configured to: determine a position of an unsuccessfully enrolled fingerprint based on the first fingerprint information; and determine the display position of the second fingerprint pattern based on the position of the unsuccessfully enrolled fingerprint.

With reference to the third aspect or the foregoing possible implementations, in another possible implementation, the display unit is specifically configured to: if the at least two fingerprint patterns are simultaneously displayed in the fingerprint enrollment interface, no longer display a fingerprint pattern touched by the user in the at least two fingerprint patterns, and continue to display all fingerprint patterns not touched by the user in the at least two fingerprint patterns; or if the at least two fingerprint patterns are sequentially displayed in the fingerprint enrollment interface, no longer display a fingerprint pattern currently touched by the user, and display a next fingerprint pattern of the fingerprint pattern currently touched by the user.

According to a fourth aspect of the embodiments of this application, a terminal is provided, where the terminal may include an input unit and a display unit, where the input unit is configured to receive a first input of a user; the display unit is configured to: in response to the first input, display a fingerprint enrollment interface, display a first fingerprint pattern in the fingerprint enrollment interface, and instruct the user to touch the displayed first fingerprint pattern; the enrollment unit is configured to: when the user touches a display position of the first fingerprint pattern, enroll first fingerprint information of the user, where a center of the first fingerprint pattern overlaps a center of a fingerprint collection area of a touchscreen of the terminal; the display unit is further configured to: no longer display the first fingerprint pattern, display a second fingerprint pattern in the fingerprint enrollment interface, and instruct the user to touch the displayed second fingerprint pattern; the enrollment unit is further configured to: when the user touches a display position of the second fingerprint pattern, enroll second fingerprint information of the user; the display unit is further configured to: no longer display the second fingerprint pattern, display a third fingerprint pattern in the fingerprint enrollment interface, and instruct the user to touch the displayed third fingerprint pattern; the enrollment unit is further configured to: when the user touches a display position of the third fingerprint pattern, enroll third fingerprint information of the user; the display unit is further configured to: no longer display the third fingerprint pattern, display a fourth fingerprint pattern in the fingerprint enrollment interface, and instruct the user to touch the displayed fourth fingerprint pattern; the enrollment unit is further configured to: when the user touches a display position of the fourth fingerprint pattern, enroll fourth fingerprint information of the user; the display unit is further configured to: no longer display the fourth fingerprint pattern, display a fifth fingerprint pattern in the fingerprint enrollment interface, and instruct the user to touch the displayed fifth fingerprint pattern; and the enrollment unit is further configured to: when the user touches a display position of the fifth fingerprint pattern, enroll fifth fingerprint information of the user, where none of centers of the second fingerprint pattern, the third fingerprint pattern, the fourth fingerprint pattern, and the fifth fingerprint pattern overlap a center of the fingerprint collection area, but the second fingerprint pattern, the third fingerprint pattern, the fourth fingerprint pattern, and the fifth fingerprint pattern at least partially overlap the fingerprint collection area, and the second fingerprint pattern, the third fingerprint pattern, the fourth fingerprint pattern, and the fifth fingerprint pattern are sequentially arranged in a clockwise direction on a circular line with the fingerprint collection area as a center.

With reference to the fourth aspect, in a possible implementation, the terminal may further include a determining unit, configured to determine a position of an unsuccessfully enrolled fingerprint, where the display unit is further configured to: display a sixth fingerprint pattern in the fingerprint enrollment interface at a position corresponding to the position of the unsuccessfully enrolled fingerprint, and instruct the user to touch the displayed sixth fingerprint pattern; and the enrollment unit is further configured to: when the user touches a display position of the sixth fingerprint pattern, enroll sixth fingerprint information of the user.

According to a fifth aspect of the embodiments of this application, a terminal is provided, where the terminal may include one or more processors, one or more memories, and one or more touchscreens, where the memory and the touchscreen are coupled to the one or more processors, the memory is configured to store computer program code, the computer program code includes a computer instruction, and when the one or more processors execute the computer instruction, the terminal performs the fingerprint enrollment method according to any one of the first aspect or the possible implementations of the first aspect; and the touchscreen is configured to display an image generated by the processor.

According to a sixth aspect of the embodiments of this application, a terminal is provided, where the terminal may include one or more processors, one or more memories, and one or more touchscreens, where the memory and the touchscreen are coupled to the one or more processors, the memory is configured to store computer program code, the computer program code includes a computer instruction, and when the one or more processors execute the computer instruction, the terminal performs the fingerprint enrollment m method according to any one of the second aspect or the possible implementations of the second aspect; and the touchscreen is configured to display an image generated by the processor.

According to a seventh aspect of the embodiments of this application, a computer storage medium is provided, Where the computer storage medium includes a computer instruction, and when the computer instruction is run on a terminal, the terminal is enabled to perform the fingerprint enrollment method according to any one of the first aspect or the possible implementations of the first aspect.

According to an eighth aspect of the embodiments of this application, a computer storage medium is provided, where the computer storage medium includes a computer instruction, and when the computer instruction is run on a terminal, the terminal is enabled to perform the fingerprint enrollment method according to any one of the second aspect or the possible implementations of the second aspect.

According to a ninth aspect of the embodiments of this application, a computer program product is provided, where when the computer program product is run on a computer, the computer is enabled to perform the fingerprint enrollment method according to any one of the first aspect or the possible implementations of the first aspect.

According to a tenth aspect of the embodiments of this application, a computer program product is provided, where when the computer program product is run on a computer, the computer is enabled to perform the fingerprint enrollment method according to any one of the second aspect or the possible implementations of the second aspect.

According to an eleventh aspect of the embodiments of this application, a control device is provided, where the control device includes a processor and a memory, the memory is configured to store computer program code, the computer program code includes a computer instruction, and when the processor executes the computer instruction, the control device performs the fingerprint enrollment method according to any one of the first aspect or the possible implementations of the first aspect, or according to any one of the second aspect or the possible implementations of the second aspect.

It may be understood that, the terminal according to the third aspect, the fourth aspect, the fifth aspect, and the sixth aspect, the computer storage medium according to the seventh aspect and the eighth aspect, the computer program product according to the ninth aspect and the tenth aspect, and the control device according to the twelfth aspect are all configured to perform the corresponding method provided above. Therefore, for beneficial effects of the terminal according to the third aspect, the fourth aspect, the fifth aspect, and the sixth aspect, the computer storage medium according to the seventh aspect and the eighth aspect, the computer program product according to the ninth aspect and the tenth aspect, and the control device according to the twelfth aspect, refer to the beneficial effects in the corresponding method provided above. Details are not described herein again.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise staled, "a plurality of" means two or more than two.

The embodiments of this application provide a fingerprint enrollment method. The method may be applied to a terminal supporting a fingerprint recognition function. According to the fingerprint enrollment method, fingerprint information at more angles and positions of a user can be enrolled when enrollment of the user does not need to be interrupted and user learning is not required, thereby improving fingerprint enrollment quality.

It should be noted that, the terminal provided in the embodiments may be a device provided with a touchscreen, such as a mobile phone, a tablet computer, a desktop computer, a laptop computer, a handheld computer, a notebook computer, an ultra-mobile personal computer (UMPC), a netbook, a cellular phone, or a personal digital assistant (PDA). A specific form of the device is not specially limited in the embodiments.

The touchscreen in the embodiments of this application has a fingerprint recognition function. For example, in a specific implementation, the fingerprint recognition function may be implemented by configuring fingerprint recognition device for the touchscreen. Specifically, a fingerprint recognition device may be mounted under the touchscreen to implement the fingerprint recognition function, or the touchscreen may be controlled by using a logic circuit to implement the fingerprint recognition function. This is not specifically limited in the embodiments of this application.

Figure 3:
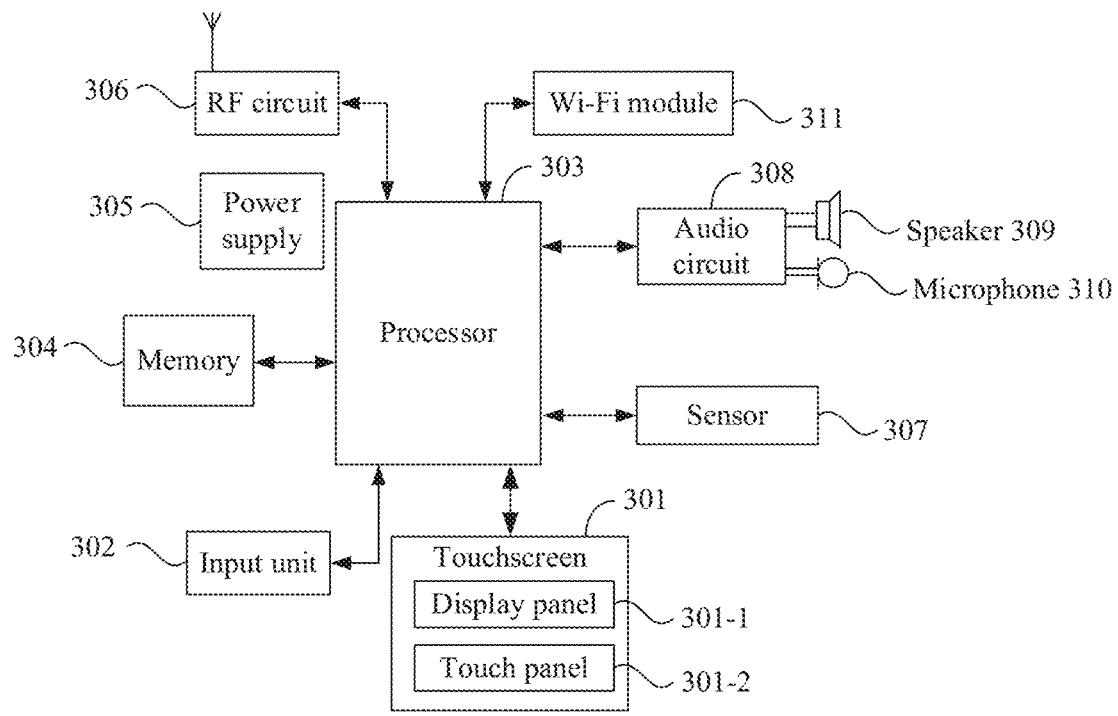
FIG. 3 is a schematic structural diagram of a mobile phone according to an embodiment of this application.

Referring to FIG. 3, that the terminal is a mobile phone is used as an example in an embodiment of this application, to describe the terminal provided in the embodiments of this application. The mobile phone shown in FIG. 3 is merely an example of the terminal, and the mobile phone may have more or fewer components than those shown in the figure, or may combine two or more components, or may have a different component configuration. The various components shown in FIG. 3 may be implemented in hardware including one or more signal processing and/or application-specific integrated circuits, software, or a combination of hardware and software.

As shown in FIG. 3, the mobile phone may include components such as a touchscreen 301, an input unit 302, a processor 303, a memory 304, a power supply 305, a radio frequency (RF) circuit 306, a sensor 307, an audio circuit 308, a speaker 309, a microphone 310, and a WI-FI module 311. These components may be connected by using a bus, or may be directly connected.

The following specifically describes the components of the mobile phone with reference to FIG. 3.

The touchscreen 301 may be configured to display information input by a user, or information provided for a user, and various menus of the mobile phone, and may further accept an input operation of the user. In this embodiment of this application, the touchscreen 301 has a fingerprint recognition function. For example, a fingerprint recognition device may be configured for the touchscreen 301 to implement the fingerprint recognition function, or the touchscreen 301 may be controlled by using a logic circuit to implement the fingerprint recognition function.

Specifically, the touchscreen 301 may include a display panel 301-1 and a touch panel 301-2.

The display panel 301-1 may be configured in a form of a liquid-crystal display (LCD), or an organic light-emitting diode (OLED), or the like.

The touch panel 301-2 may collect a contact or non-contact operation performed by the user on or near the touch panel 301-2 (for example, an operation performed by the user on or near the touch panel 301-2 by using any suitable object or accessory such as a finger or a stylus, or a motion sensing operation may be included, where the operation includes a single-point control operation, a multi-point control operation, or another type of operation), and drive a corresponding connection apparatus based on a preset program. Optionally, the touch panel 301-2 may include two parts: a touch detection apparatus and a touch controller. The touch detection apparatus detects a touch position and posture of the user, detects a signal caused by a touch operation, and transfers the signal to the touch controller. The touch controller receives a touch signal from the touch detection apparatus, converts the received touch signal into information that can be processed by the processor 303, sends the information to the processor 303, and can receive a command sent by the processor 303 and execute the command. In addition, the touch panel may be implemented by using various types such as resistive, capacitive, infrared, and surface acoustic wave, or the touch panel 301-2 may be implemented by using any technology developed in the future. This is not limited in this embodiment of this application. In this embodiment of this application, when the fingerprint recognition device is configured for the touchscreen 301 to implement the fingerprint recognition function, the fingerprint recognition device may be specifically disposed under the touch panel 301-2.

Further, the touch panel 301-2 may cover the display panel 301-1, and the user may perform an operation on or near the touch panel 301-2 covering the display panel 301-1 based on content displayed on the display panel 301-1 (the displayed content includes any one or any combination of the following: a soft keyboard, a virtual mouse, a virtual key, an icon, and the like). After detecting the operation on or near the touch panel 301-2, the touch panel 301-2 transfers the touch panel 301-2 to the processor 303 by using an input/output subsystem to determine an input of the user. Subsequently, the processor 303 provides a corresponding visual output on the display panel 301-1 based on the input of the user by using the input/output subsystem. Although in FIG. 3, the touch panel 301-2 and the display panel 301-1 are used as two independent components to implement input and output functions of the mobile phone, in some embodiments, the touch panel 301-2 and the display panel 301-1 may be integrated to implement the input and output functions of the mobile phone.

The input unit 302 may be the touch panel 301-2, or may be another input device. The another input device may be configured to receive input numerical or character information, and generate a key signal input related to a user setting and function control of the mobile phone. Specifically, the another input device may include any one or any combination of the following: a physical keyboard, a function key (such as a volume control key or a switch key), a trackball, a mouse, a joystick, an optical mouse (the optical mouse is a touch-sensitive surface that does not display a visual output, or an extension of a touch-sensitive surface formed by the touchscreen), or the like. The another input device is connected to another input device controller of the input/output subsystem, and exchanges signals with the processor 303 under control of the another input device.

The processor 303 is a control center of the mobile phone, connects all parts of the entire mobile phone by using various interfaces and lines, and performs various functions and data processing of the mobile phone by operating or executing a software program and/or a module stored in the memory 304 and invoking data stored in the memory 304, to perform overall monitoring on the mobile phone. Optionally, the processor 303 may include one or more processing units. The processor 303 may integrate an application processor and a modem processor. The application processor mainly processes an operating system, a user interface, an application program, and the like. The modem processor mainly processes wireless communication. It may be understood that, the modem processor may alternatively not be integrated into the processor 303.

The memory 304 may be configured to store data, a software program, and a module. The processor 303 operates the data, the software program, and the module stored in the memory 304, to perform various function applications and data processing of the mobile phone, for example, perform the fingerprint enrollment method provided. The memory 304 may mainly include a program storage area and a data storage area. The program storage area may store an operating system, an application program (such as a sound playback function or an image display function) required by at least one function, or the like. The data storage area may store data (such as audio data or an address book) created based on use of the mobile phone, or the like. In addition, the memory 304 may be a volatile memory, for example, a random-access memory (RAM) or a high-speed RAM; or a non-volatile memory, for example, a magnetic memory device, a flash memory device, a read-only memory (ROM), a flash memory, a hard disk drive (HDD), or a solid-state drive (SSD); or a combination of the foregoing types of memories. In the foregoing embodiments, the operating system stored in the memory 304 may be an iOS® operating system developed by APPLE, an Android® open source operating system developed by GOOGLE, a Windows® operating system developed by MICROSOFT, or the like.

The power supply 305 may be a battery, and is logically connected to the processor 303 by using a power management system, to implement functions such as charging, discharging, and power consumption management by using the power management system.

The RF circuit 306 may be configured to receive and send signals during information receiving or sending or in a call process, and particularly, send received downlink information of a base station to the processor 303 for processing. In addition, the RF circuit 306 sends designed uplink data to the base station. Usually, the RF circuit 306 includes but is not limited to an antenna, at least one amplifier, a transceiver, a coupler, a low-noise amplifier (LNA), a duplexer, and the like. In addition, the RF circuit 306 may further communicate with a network and another device through wireless communication. The wireless communication may use any communication standard or protocol, including any one or any combination of the following: a Global System for Mobile Communications (GSM), a General Packet Radio Service (GPRS), code-division multiple address (CDMA), wideband CDMA (WCDMA), Long Term Evolution (LTE), an email, a short message service (SMS), and the like.

The mobile phone may further include at least one sensor 307, such as a light sensor, a velocity sensor, a Global Positioning System (GPS) sensor, and another sensor. The light sensor may include an ambient light sensor and a proximity sensor. The ambient light sensor may adjust brightness of the display panel 301-1 based on brightness of an ambient light. The proximity sensor may turn off the display panel 301-1 and/or backlight when the mobile phone mobile is moved to an ear. As a type of velocity sensor, an accelerometer sensor can detect magnitude of acceleration of the mobile phone in various directions (usually three axes), can detect magnitude and a direction of gravity when the accelerometer sensor is stationary, and can be applied to an application for recognizing an attitude of the mobile phone (such as horizontal and vertical screen switching, a related game, or magnetometer attitude calibration), a vibration recognition related function (such as a pedometer or a tap), or the like. For other sensors such as a gyroscope, a barometer, a hygrometer, a thermometer, an infrared sensor, and a pressure sensor that can be further configured on the mobile phone, details are not described herein.

The audio circuit 308, the speaker 309, and the microphone 310 may provide an audio interface between the user and the mobile phone. The audio circuit 308 may convert received audio data into an electrical signal and then transmits the electrical signal to the speaker 309, and the speaker 309 converts the electrical signal into a sound signal and outputs the sound signal. On the other hand, the microphone 310 converts the collected sound signal into an electrical signal, and the audio circuit 308 receives the electrical signal, converts the electrical signal into audio data, and outputs the audio data to the RF circuit 306 to send the audio data to, for example, another mobile phone, or outputs the audio data to the processor 303 for further processing.

The Wi-Fi module 311 may be a module including Wi-Fi chip and a Wi-Fi chip driver. The Wi-Fi chip has a capability of running a wireless Internet standard protocol.

In addition, an operating system runs on the foregoing component. An application program may be installed and run on the operating system. In addition, although not shown, the mobile phone may further include components such as a BLUETOOTH module and a camera. The BLUETOOTH module is a printed circuit board assembly (PCBA) integrating a BLUETOOTH function, and is used for short-range wireless communication.

Methods in the following embodiments may all be implemented in a mobile phone having the foregoing hardware structure.

The following specifically describes, with reference to the accompanying drawings, the fingerprint enrollment method provided in the embodiments of this application. It should be noted that, for ease of understanding, the fingerprint enrollment method provided in the embodiments of this application is specifically described in the following embodiments of this application all by using an example in which a fingerprint recognition device is configured for a touchscreen to implement a fingerprint recognition function. In another manner, for example, a specific implementation of the fingerprint enrollment method in a scenario in which the touchscreen is controlled by using a logic circuit to implement the fingerprint recognition function is similar to a specific implementation of the fingerprint enrollment method in a scenario in which a fingerprint recognition device is configured for the touchscreen to implement the fingerprint recognition function. Details are not described again in this application.

Figure 4:
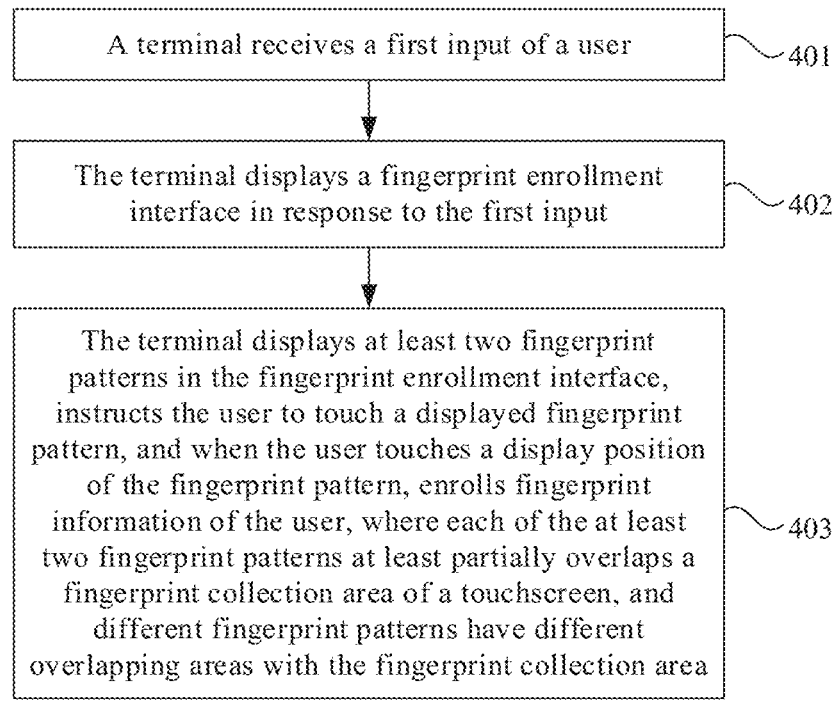
FIG. 4 is a schematic flowchart of a fingerprint enrollment method according to an embodiment of this application.

FIG. 4 is a schematic flowchart of a fingerprint enrollment method according to an embodiment of this application. The method is applied to a terminal, and the terminal includes a touchscreen with a fingerprint recognition function. As shown in FIG. 4, the method may include S401 to S403.

Figure 1:
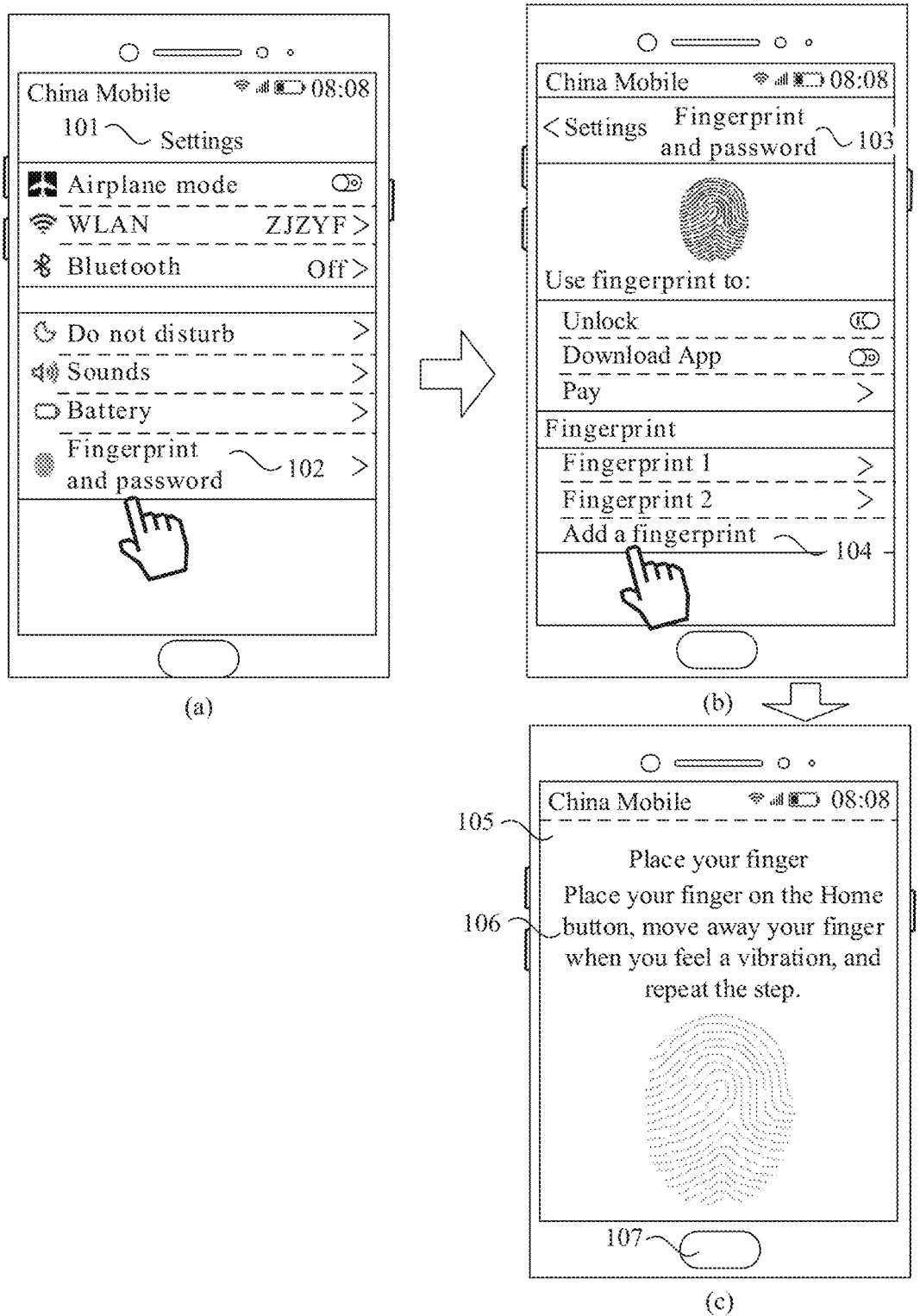
FIG. 1 is a first schematic diagram of a display interface of a device according to an embodiment of this application.
Figure 2:
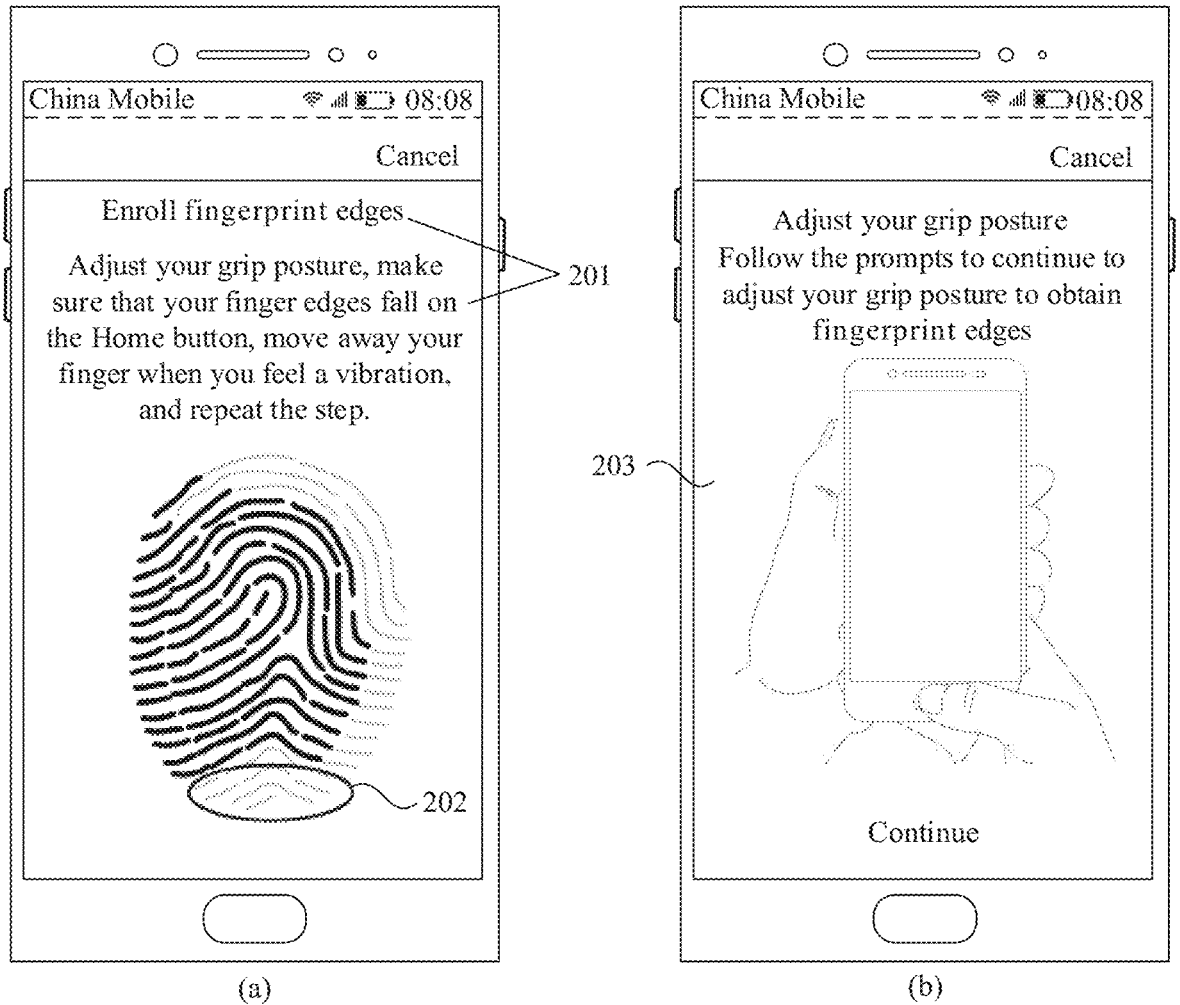
FIG. 2 is a second schematic diagram of a display interface of a device according to an embodiment of this application.

S401. The terminal receives a first input of a user,

The first input is an input that triggers the terminal to display a fingerprint enrollment interface. For example, with reference to FIG. 1, the first input may be specifically a fingerprint addition operation of the user, for example, a touch operation performed on the add fingerprint option 104 in the fingerprint and password setting interface 103, or may be another operation that triggers a fingerprint addition function, for example, a voice input, a gesture input, or a floating operation. This is not specifically limited in this embodiment of this application.

S402. The terminal displays the fingerprint enrollment interface in response to the first input.

In this embodiment of this application, the fingerprint enrollment interface is an interface for enrolling a fingerprint of the user. In some embodiments, after the terminal displays the fingerprint enrollment interface, a fingerprint collection function of the touchscreen of the terminal is enabled. For example, specifically, a fingerprint collection function of a fingerprint recognition device (which may also be referred to as a fingerprint sensor) disposed under the touchscreen may be enabled, so that the fingerprint recognition device can collect fingerprint information of the user when the user touches a corresponding position of the fingerprint recognition device on the touchscreen.

S403. The terminal displays at least two fingerprint patterns in the fingerprint enrollment interface, instructs the user to touch a displayed fingerprint pattern, and when the user touches a display position of the fingerprint pattern, enrolls fingerprint information of the user, where each of the at least two fingerprint patterns at least partially overlaps a fingerprint collection area (for example, the corresponding position of the fingerprint recognition device) of the touchscreen, and different fingerprint patterns have different overlapping areas with the fingerprint collection area.

The display position of the fingerprint pattern at least partially overlaps the fingerprint collection area. Therefore, when the user touches the fingerprint pattern, a fingerprint of the user is collected by the fingerprint recognition device.

The fingerprint collection area in this embodiment of this application is a projection area of the fingerprint recognition device on the touchscreen.

In a specific implementation, the terminal may simultaneously display at least two fingerprint patterns in the fingerprint enrollment interface, or may sequentially display at least two fingerprint patterns, and instruct the user to touch display positions of the displayed fingerprint patterns, so that corresponding fingerprint information of the user can be enrolled into the terminal. To enroll more fingerprint information of the user, each of the at least two fingerprint patterns displayed in the fingerprint enrollment interface at least partially overlaps the fingerprint collection area, for example, the corresponding position of the fingerprint recognition device, and different fingerprint patterns have different overlapping areas with the fingerprint collection area.

In some embodiments, S403 may specifically include: displaying a first fingerprint pattern in the fingerprint enrollment interface, instructing the user to touch the displayed first fingerprint pattern, and when the user touches a display position of the first fingerprint pattern, enrolling first fingerprint information of the user, where a center of the first fingerprint pattern overlaps a center of the fingerprint collection area; and displaying at least one second fingerprint pattern in the fingerprint enrollment interface, instructing the user to touch the displayed second fingerprint pattern, and when the user touches a display position of the second fingerprint pattern, enrolling second fingerprint information of the user, where a center of the second fingerprint pattern does not overlap the center of the fingerprint collection area but the second fingerprint pattern at least partially overlaps the fingerprint collection area.

The display position of the second fingerprint pattern may specifically include at least one of the following manners: on a circular line or a cross line with the fingerprint collection area as a center; on a straight line determined based on a bottom right corner and a top left corner of the fingerprint collection area; on a straight line determined based on a top right corner and a bottom left corner of the fingerprint collection area; on a vertical line passing through the center of the fingerprint collection area; on a left side of a vertical line passing through the center of the fingerprint collection area; or on a right side of a vertical line passing through the center of the fingerprint collection area.

In some embodiments, that the terminal displays the at least one second fingerprint pattern in the fingerprint enrollment interface may be specifically: the terminal displays the at least one second fingerprint pattern based on a configured default manner (the default manner may be any one of the foregoing manners); or the terminal may select any one of the foregoing manners to display the at least one second fingerprint pattern; or the terminal may select a corresponding manner with reference to information about a finger used by the user to touch a fingerprint pattern, to display the at least one second fingerprint pattern; or the terminal may determine a position of an unsuccessfully enrolled fingerprint based on the first fingerprint information enrolled by the user when the user touches the first fingerprint pattern, and select a corresponding manner with reference to the position of the unsuccessfully enrolled fingerprint, to display the at least one fingerprint pattern.

Figure 5:
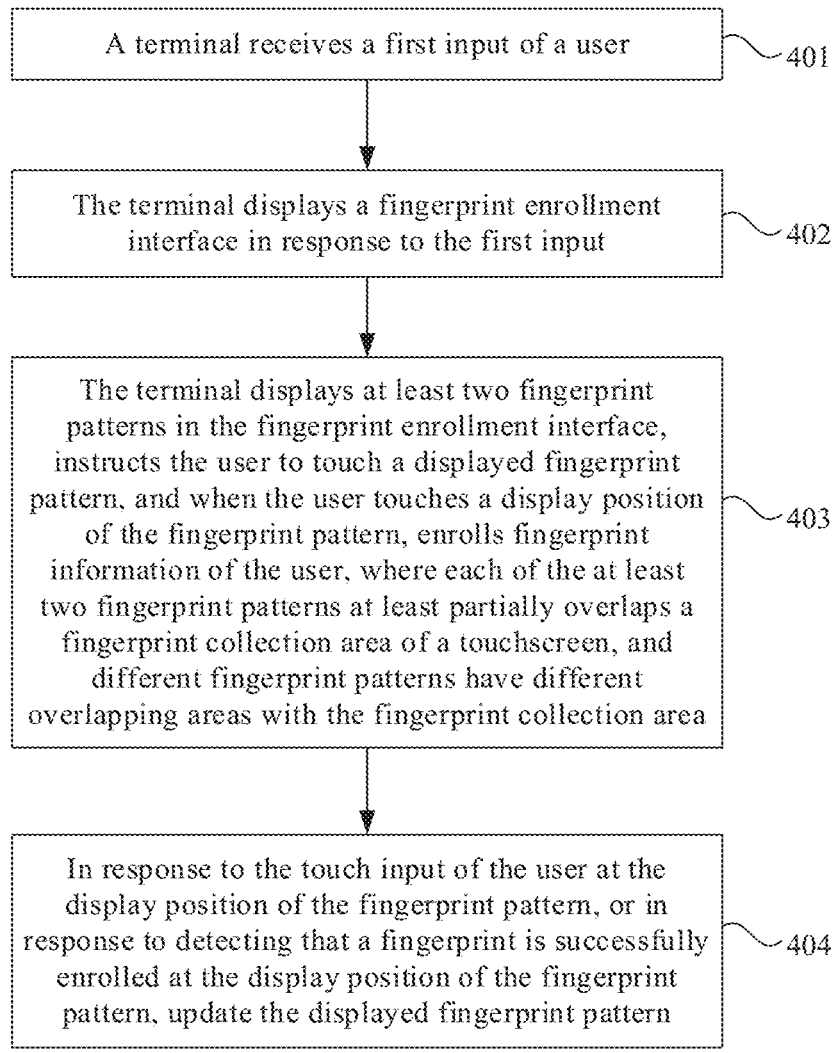
FIG. 5 is a schematic flowchart of another fingerprint enrollment method according to an embodiment of this application.

Further, as shown in FIG. 5, the foregoing fingerprint collection method may further include S404.

S404. In response to the touch input of the user at the display position of the fingerprint pattern, or in response to detecting that a fingerprint is successfully enrolled at the display position of the fingerprint pattern, update the displayed fingerprint pattern.

In some embodiments, S404 may specifically include: if the at least two fingerprint patterns are simultaneously displayed in the fingerprint enrollment interface, in response to a touch input of the user at a display position of a fingerprint pattern, or in response to detecting that a fingerprint is successfully enrolled at the display position of the fingerprint pattern, the terminal no longer displays the fingerprint pattern, and continues to display all fingerprint patterns not touched by the user in the at least two fingerprint patterns; or if the at least two fingerprint patterns are sequentially displayed in the fingerprint enrollment interface, in response to a touch input of the user at a display position of a fingerprint pattern, or in response to detecting that a fingerprint is successfully enrolled at the display position of the fingerprint pattern, the terminal no longer displays the fingerprint pattern, and displays a next fingerprint pattern of the fingerprint pattern.

For ease of understanding, the following specifically describes S403 and S404 by using an example in which the terminal sequentially displays at least two fingerprint patterns in the fingerprint enrollment interface, and instructs the user to touch a displayed fingerprint pattern, to enroll fingerprint information.

Figure 6:
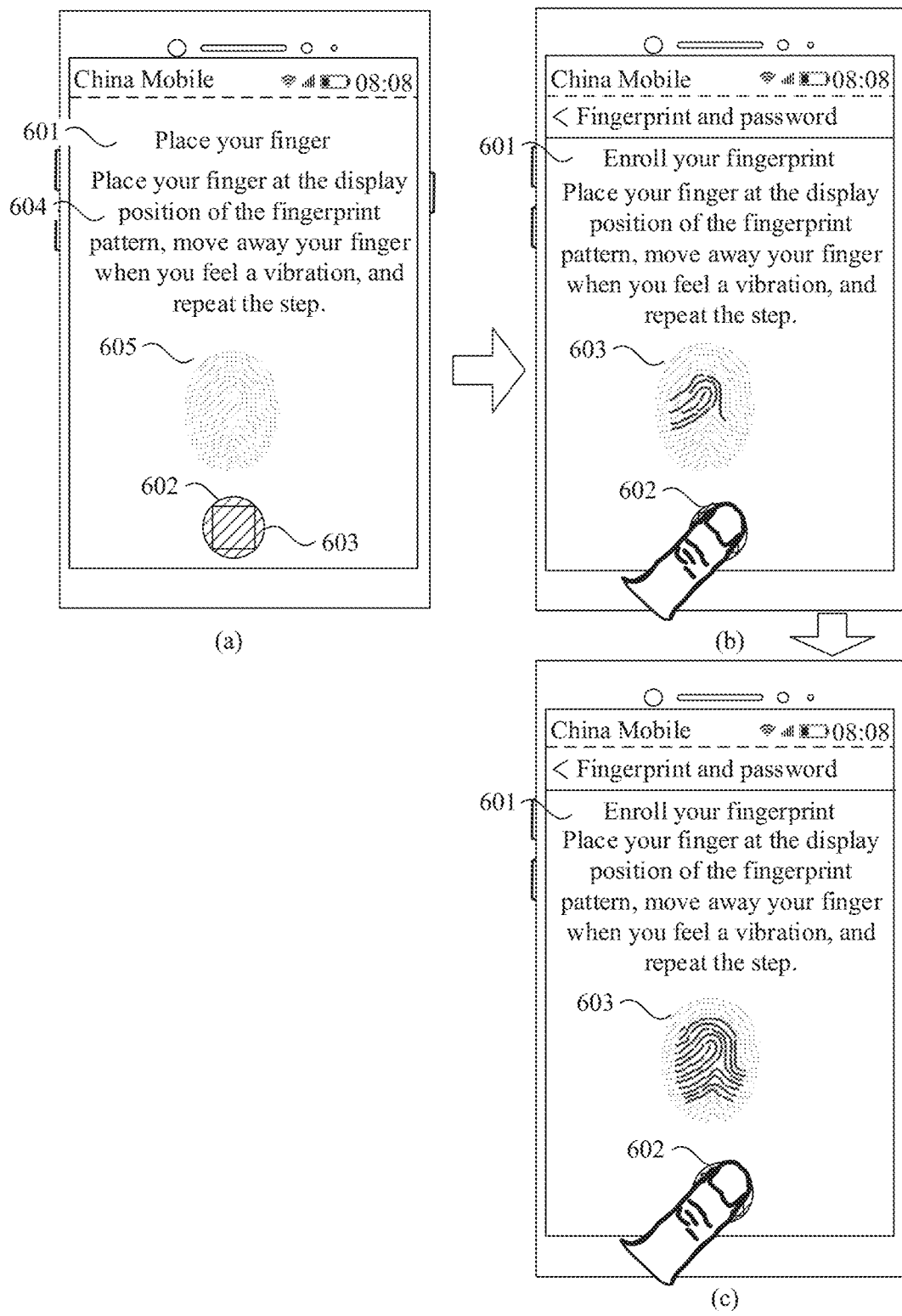
FIG. 6 is a third schematic diagram of a display interface of a device according to an embodiment of this application.

With reference to FIG. 6, for example, it is assumed that as shown in FIG. 6, the fingerprint enrollment interface displayed by the terminal in response to the first input of the user is shown in 601. In the fingerprint enrollment interface 601, the terminal displays a fingerprint pattern 602, and instructs the user to touch the displayed fingerprint pattern 602. As shown in (a) in FIG. 6, a center of the fingerprint pattern 602 overlaps a center of a fingerprint collection area 603. By touching the fingerprint pattern 602, the user may enroll fingerprint information of a middle position of a finger. It should be noted that, usually, the terminal does not display the fingerprint collection area 603, that is, a square box of the fingerprint collection area 603 shown in (a) in FIG. 6 is not displayed in the fingerprint enrollment interface 601.

In a possible implementation, the fingerprint collection area 603 is the projection area of the fingerprint recognition device on the touchscreen.

Usually, the fingerprint information of the middle position of the finger of the user may be completed by the user by repeating a lift-place finger action for a plurality of times. For example, as shown in (b) and (c) in FIG. 6, the user touches a display position of the fingerprint pattern 602 twice with a finger (to be specific, first places the finger, then lifts the finger, and then places the finger) based on the displayed fingerprint pattern 602. Fingerprint information of the user may be enrolled into the terminal in response to each touch of the user.

In this embodiment of this application, a fingerprint pattern, for example, the fingerprint pattern 602, may instruct the user to touch the fingerprint pattern. To further strengthen an instruction function of the fingerprint pattern, the fingerprint pattern may further be displayed by using a special display effect, for example, a bright or special color, flicker, special brightness, contrast, grayscale, or animation effect. This is not specially limited in this embodiment of this application. In addition, in terms of a display manner of fingerprint patterns, all fingerprint patterns may be statically displayed in an interface, or all fingerprint patterns may be simultaneously displayed, but each fingerprint pattern is dynamically displayed, to form an input sequence prompt. For example, all the fingerprint patterns are sequentially illuminated in a clockwise or counterclockwise direction. Alternatively, one or more fingerprint patterns may be displayed at a time, and next one or more fingerprint patterns are displayed when a preset condition is met, for example, when a user input meets the preset condition, or when a display time meets the preset condition.

In addition, in the fingerprint enrollment interface 601, text information 604 may further be displayed, to further prompt the user to touch the displayed fingerprint pattern to enroll fingerprint information, and a fingerprint enrollment prompt area 604 may further be displayed, where the fingerprint enrollment prompt area 604 may prompt a position of the fingerprint information enrolled by the user on a finger. For example, as shown in (b) and (c) in FIG. 6, fingerprint lines are filled in the fingerprint enrollment prompt area 604, to prompt the user which part of the fingerprint of the finger is successfully enrolled.

After the fingerprint information of the middle position of the finger of the user is enrolled by displaying the fingerprint pattern 602, the terminal may no longer display the fingerprint pattern 602, but display a fingerprint pattern at another position, to instruct the user to enroll fingerprint information of an edge position of the finger. The following specifically describes, by using different implementations as examples, the case in which the fingerprint pattern is displayed at the another position, to instruct the user to enroll the fingerprint information of the edge position of the finger.

Implementation 1: For example, with reference to FIG. 7 to FIG. 11, that the terminal displays a fingerprint pattern at another position based on a configured default manner to instruct the user to enroll fingerprint information of an edge position of the finger is used as an example, and it is assumed that the default manner is that a display position of the fingerprint pattern is located on a circular line with the fingerprint collection area as a center.

Figure 7:
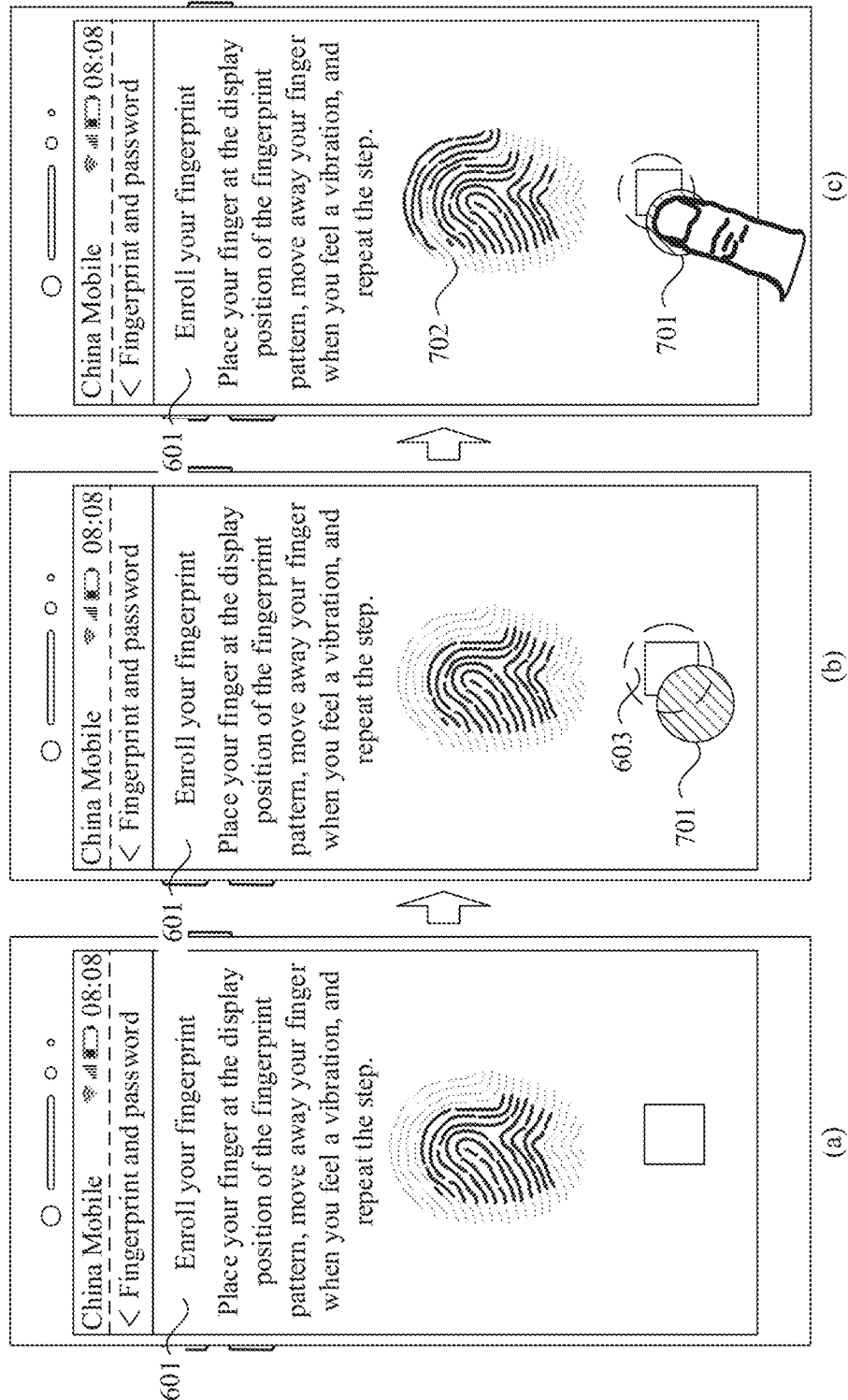
FIG. 7 is a fourth schematic diagram of a display interface of a device according to an embodiment of this application.

With reference to FIG. 6, as shown in (a) in FIG. 7, after the fingerprint information of the middle position of the finger of the user is enrolled by displaying the fingerprint pattern 602, the fingerprint enrollment interface 601 may not display the fingerprint pattern 602. As shown in (b) in FIG. 7, the terminal displays a fingerprint pattern 701 in the fingerprint enrollment interface 601 on a circular line with the fingerprint collection area 603 as a center, and instructs the user to touch the displayed fingerprint pattern 701. As shown in (c) in FIG. 7, when the user touches a display position of the fingerprint pattern 701 with a finger, fingerprint information of a corresponding position of the finger of the user is enrolled into the terminal. It may be learned that, a center of the fingerprint pattern 701 does not overlap the center of the fingerprint collection area 603, but the fingerprint pattern 701 partially overlaps the fingerprint collection area 603. In addition, as shown in (c) in FIG. 7, a fingerprint enrollment prompt area 702 may be filled with corresponding fingerprint lines (extra fingerprint lines obtained through comparison with those in (b) in FIG. 7 are fingerprint lines used for filling this time), to prompt the user that fingerprint information of a corresponding position is enrolled.

Figure 8:
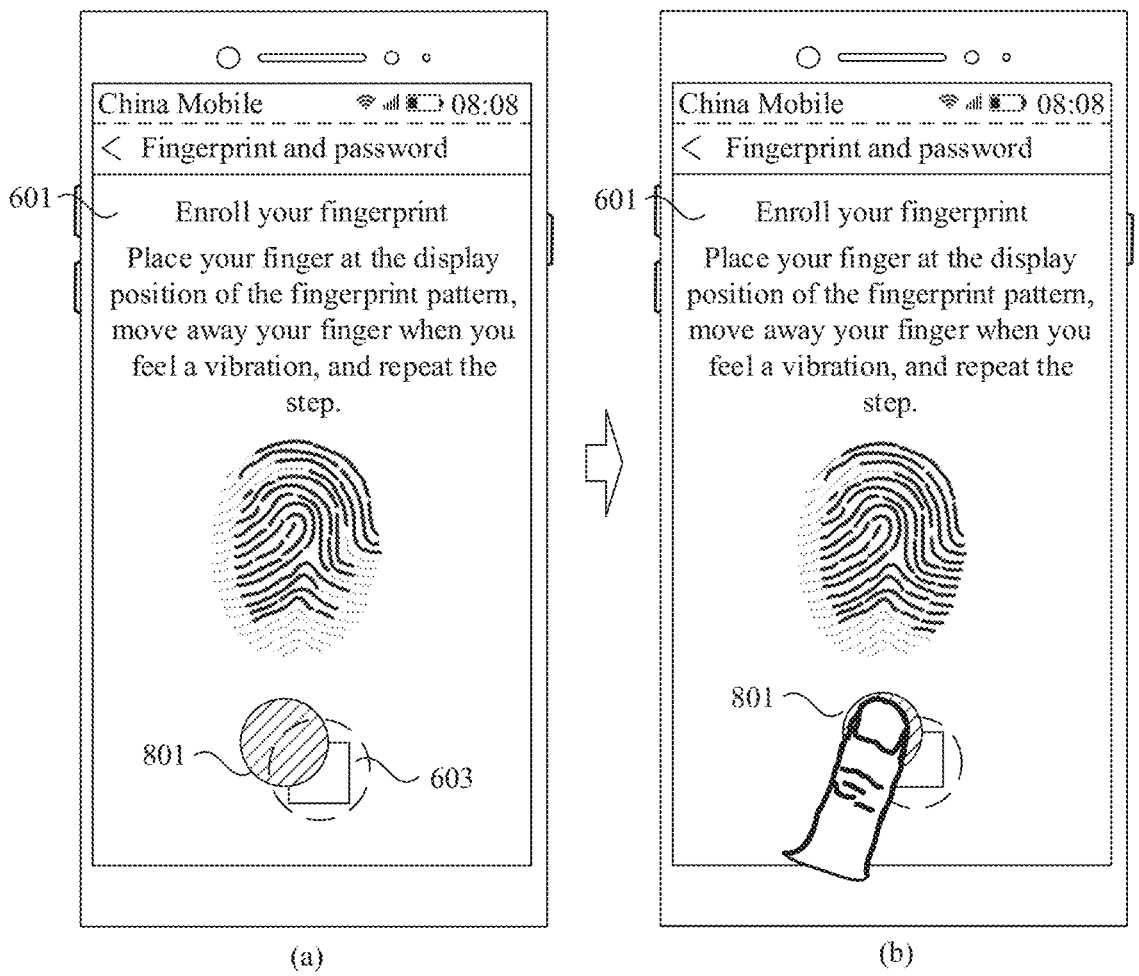
FIG. 8 is a fifth schematic diagram of a display interface of a device according to an embodiment of this application.
Figure 9:
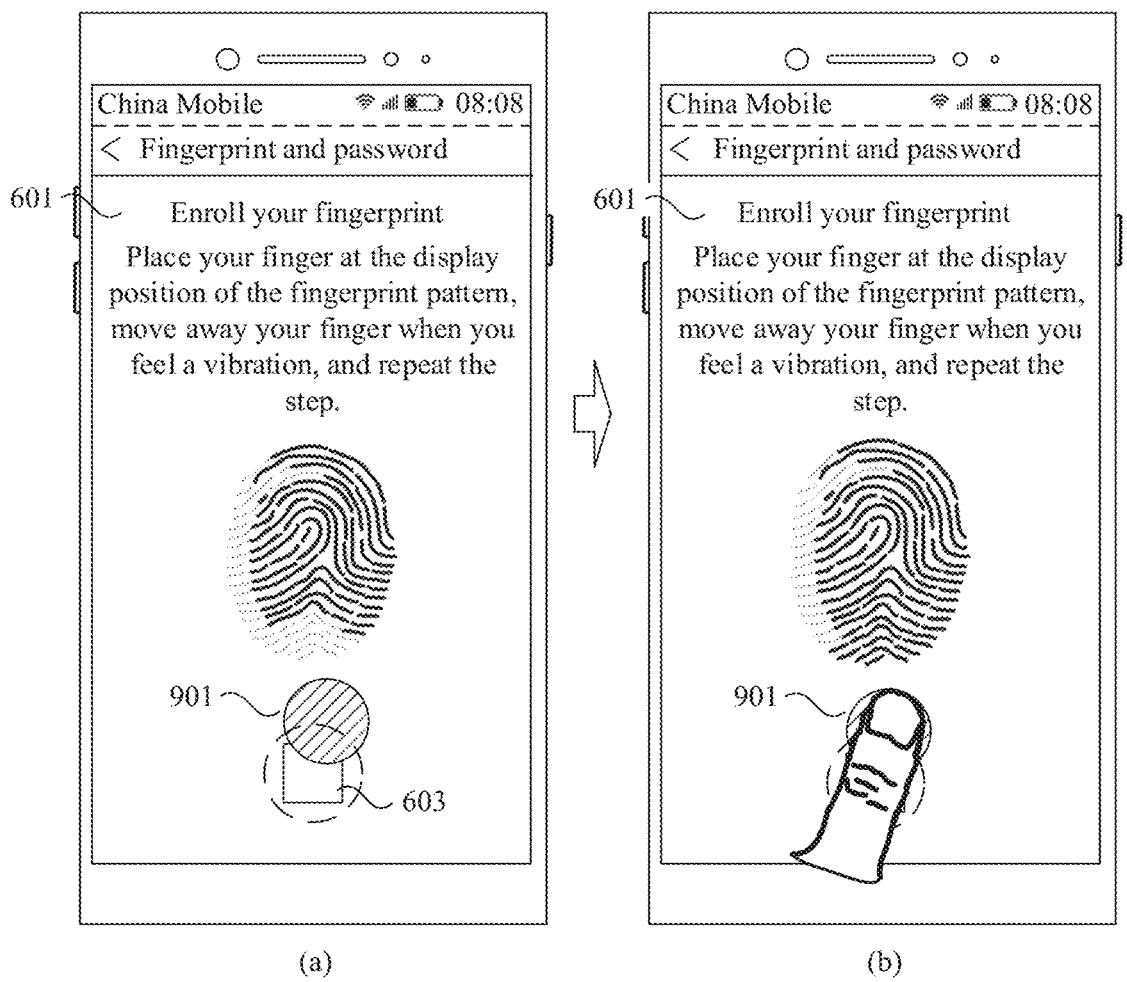
FIG. 9 is a sixth schematic diagram of a display interface of a device according to an embodiment of this application.
Figure 10:
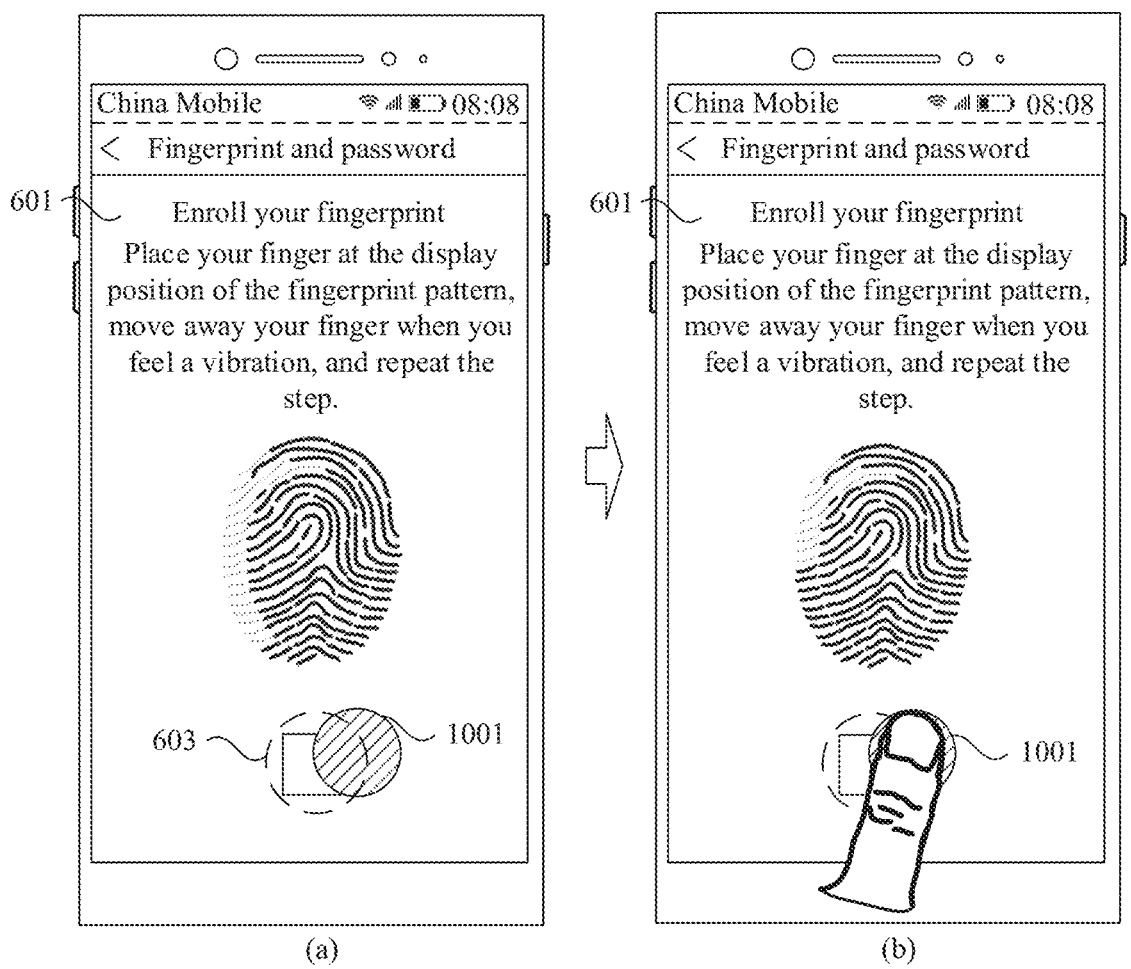
FIG. 10 is a seventh schematic diagram of a display interface of a device according to an embodiment of this application.
Figure 11:
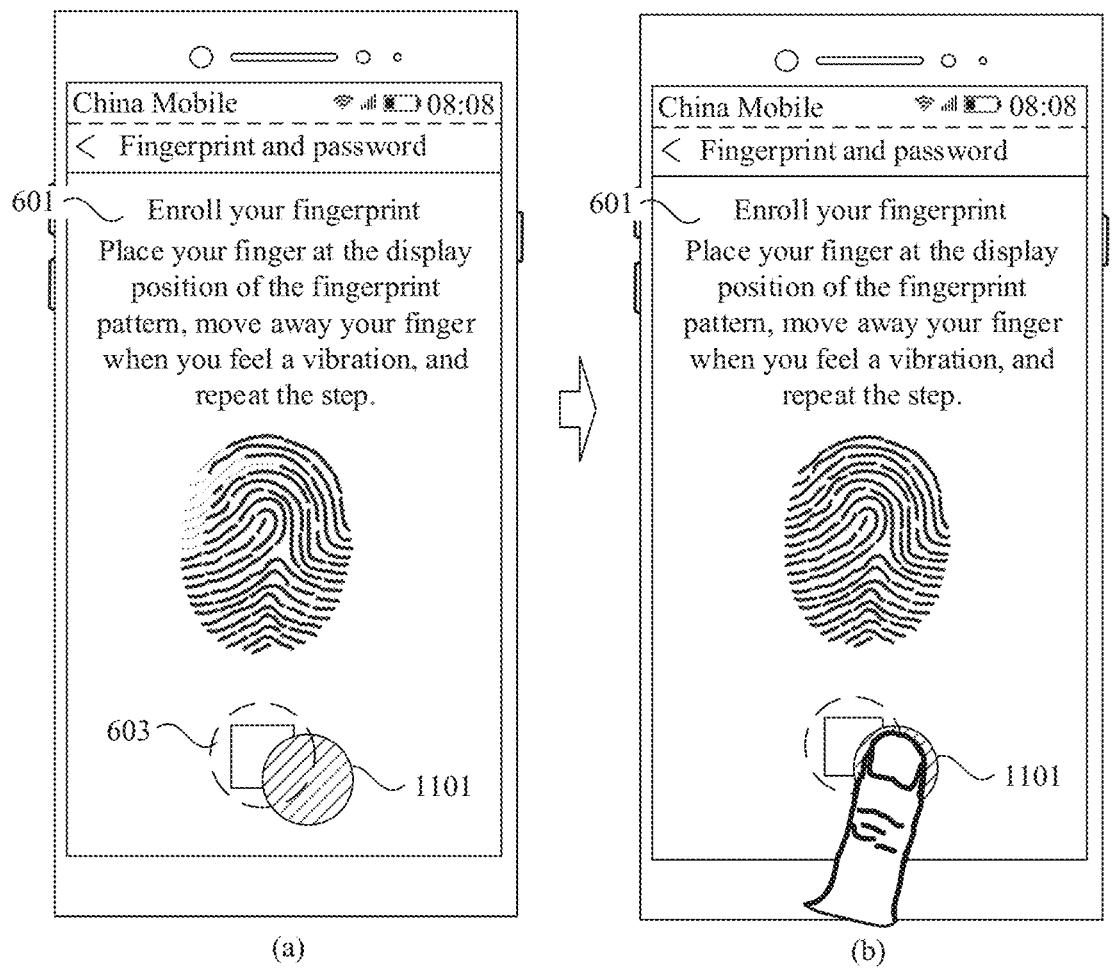
FIG. 11 is an eighth schematic diagram of a display interface of a device according to an embodiment of this application.

After the user touches the display position of the fingerprint pattern 701, or a fingerprint is successfully enrolled at the display position at which the fingerprint pattern 701 is enrolled into the terminal, as shown in (a) in FIG. 8, the terminal no longer displays the fingerprint pattern 701 in the fingerprint enrollment interface 601, but displays a fingerprint pattern 801 on a circular line with the fingerprint collection area 603 as a center, and instructs the user to touch the displayed fingerprint pattern 801. As shown in (b) in FIG. 8, when the user touches a display position of the fingerprint pattern 801 with a finger, fingerprint information of a corresponding position of the finger of the user is enrolled into the terminal. It may be learned that, a center of the fingerprint pattern 801 does not overlap the center of the fingerprint collection area 603, but the fingerprint pattern 801 partially overlaps the fingerprint collection area 603, and an overlapping part of the fingerprint pattern 701 and the fingerprint collection area 603 is different from an overlapping part of the fingerprint pattern 801 and the fingerprint collection area 603. In addition, as shown in (b) in FIG. 8, a fingerprint enrollment prompt area may also be filled with corresponding fingerprint lines (extra fingerprint lines obtained through comparison with those in (a) in FIG. 8 are fingerprint lines used for filling this time), to prompt the user that fingerprint information of a corresponding position is enrolled. Similarly, referring to FIG. 9 to FIG. 11, the terminal sequentially displays a fingerprint pattern 901, a fingerprint pattern 1001, and a fingerprint pattern 1101 in the fingerprint enrollment interface 601 on the circular line with the fingerprint collection area 603 as a center, and the terminal may sequentially enroll fingerprint information of corresponding positions. It may be learned that, in the fingerprint pattern 701, the fingerprint pattern 801, the fingerprint pattern 901, the fingerprint pattern 1001, and the fingerprint pattern 1101, different fingerprint patterns have different overlapping areas with the fingerprint collection area 603. In this way, the terminal can obtain a plurality of pieces of fingerprint information of edge positions of the finger of the user. The terminal may further generate a fingerprint template of the finger based on all the enrolled fingerprint information and save the fingerprint template, for subsequent authentication.

It should be noted that, when the fingerprint information of the edge position of the finger of the user is enrolled by displaying the fingerprint patterns on the circular line with the fingerprint collection area as a center, as shown in the example of this embodiment of this application, a quantity of the fingerprint patterns displayed on the circular line is 5. However, in this embodiment of this application, a quantity of fingerprint patterns displayed on the circular line is not specifically limited, and a display position of a first displayed fingerprint pattern on the circular line is not specifically limited. The quantity of fingerprint patterns displayed on the circular line and the display position of the first displayed fingerprint pattern on the circular line may be set based on a requirement of an actual application scenario.

Implementation 2: For example, with reference to FIG. 12 to FIG. 15, that the terminal displays a fingerprint pattern at another position based on a configured default manner to instruct the user to enroll fingerprint information of an edge position of the finger is used as an example, and it is assumed that the default manner is that a display position of the fingerprint pattern is located on a cross line with the fingerprint collection area as a center.

Figure 12:
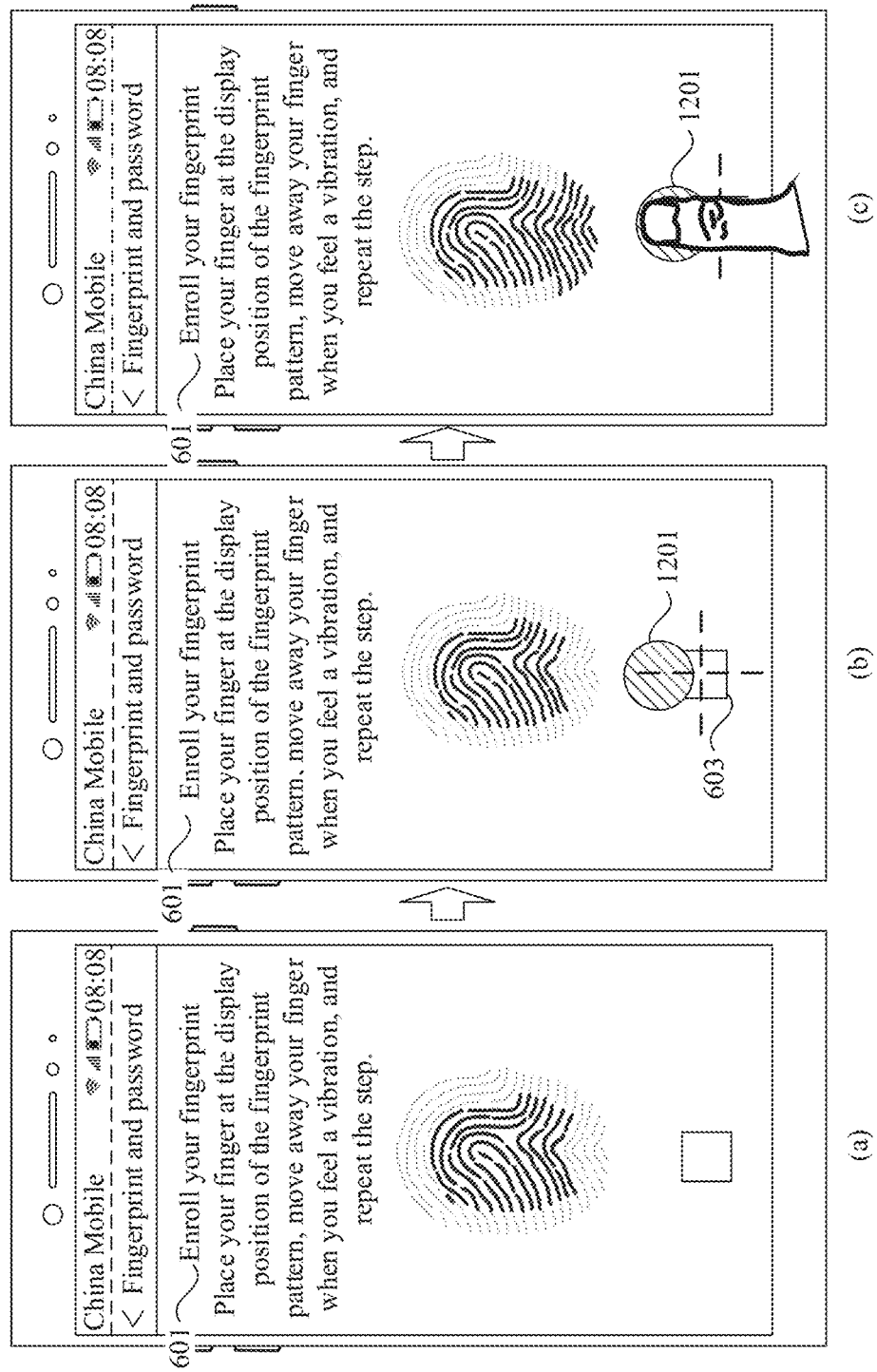
FIG. 12 is a ninth schematic diagram of a display interface of a device according to an embodiment of this application.
Figure 13:
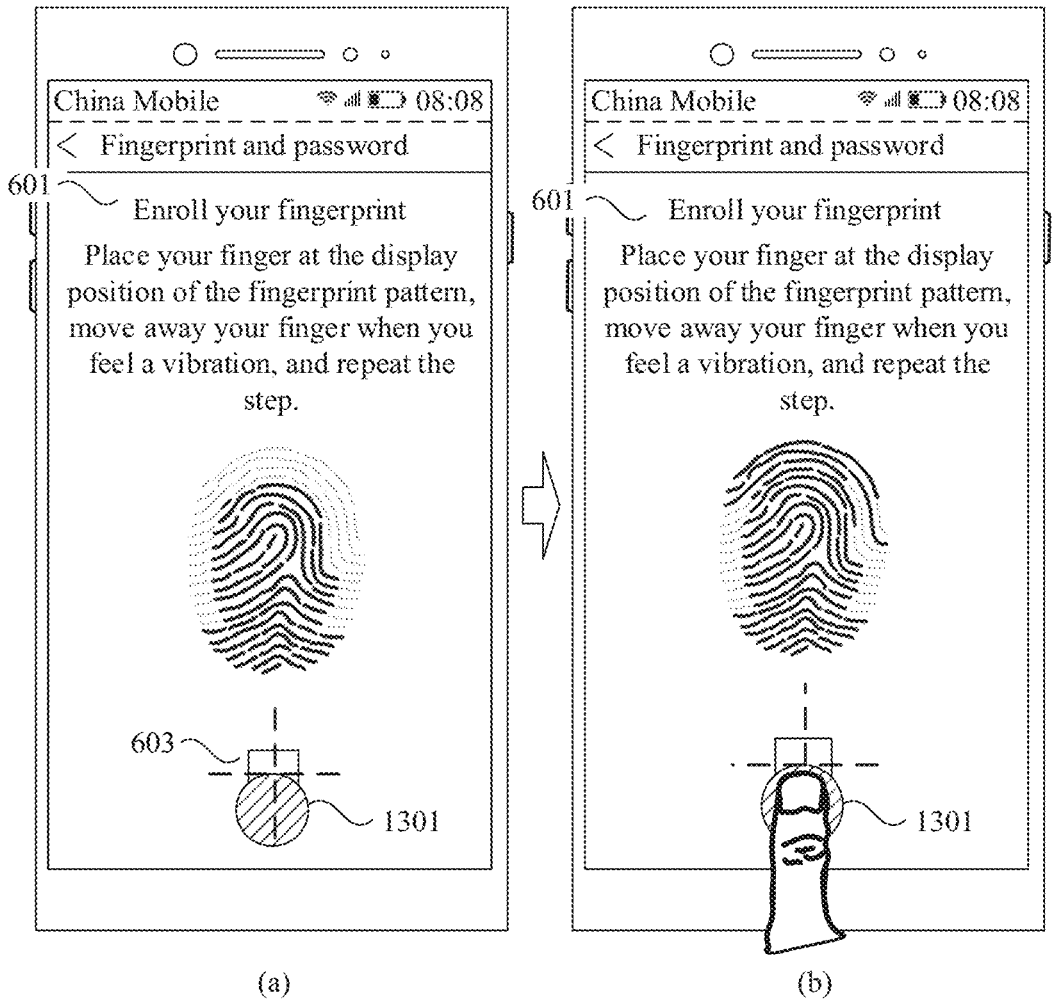
FIG. 13 is a tenth schematic diagram of a display interface of a device according to an embodiment of this application.
Figure 14:
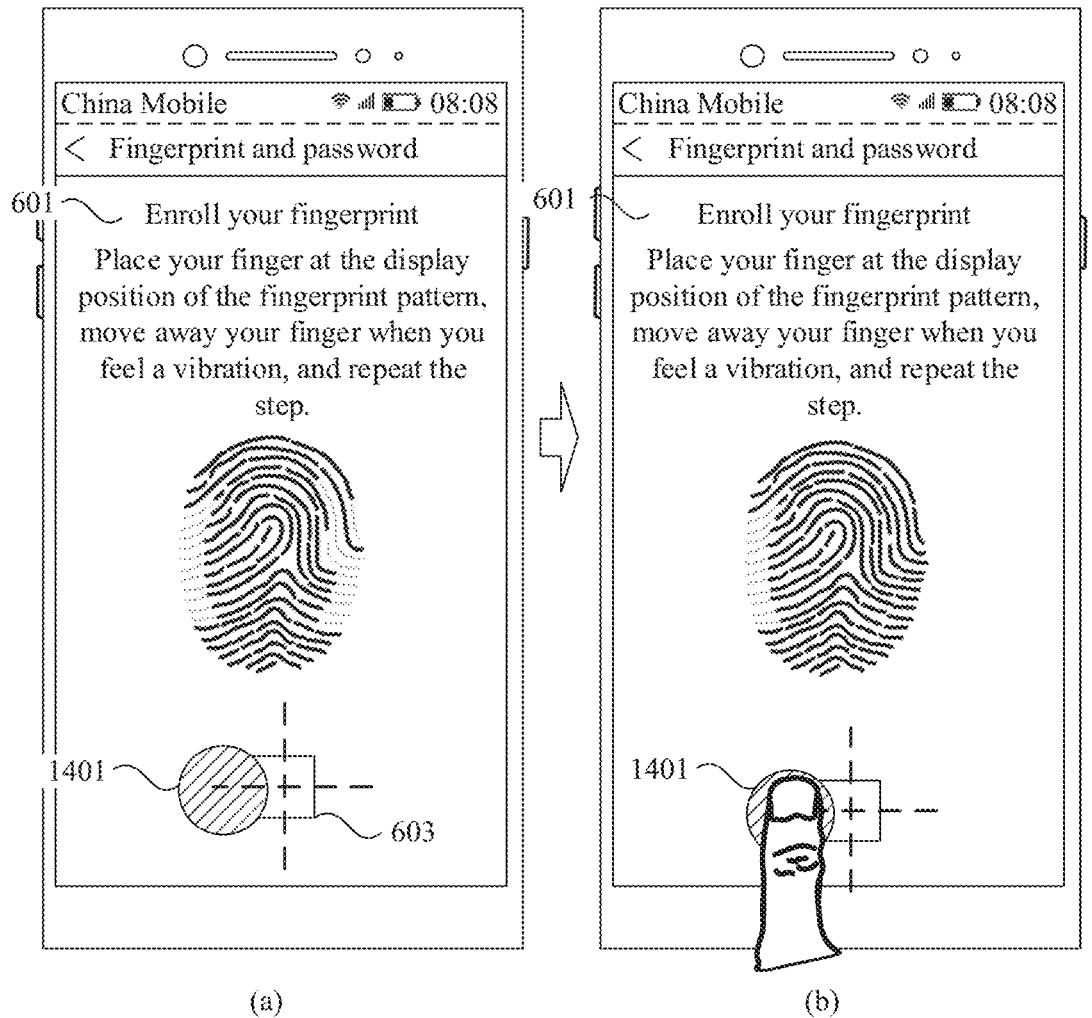
FIG. 14 is an eleventh schematic diagram of a display interface of a device according to an embodiment of this application.
Figure 15:
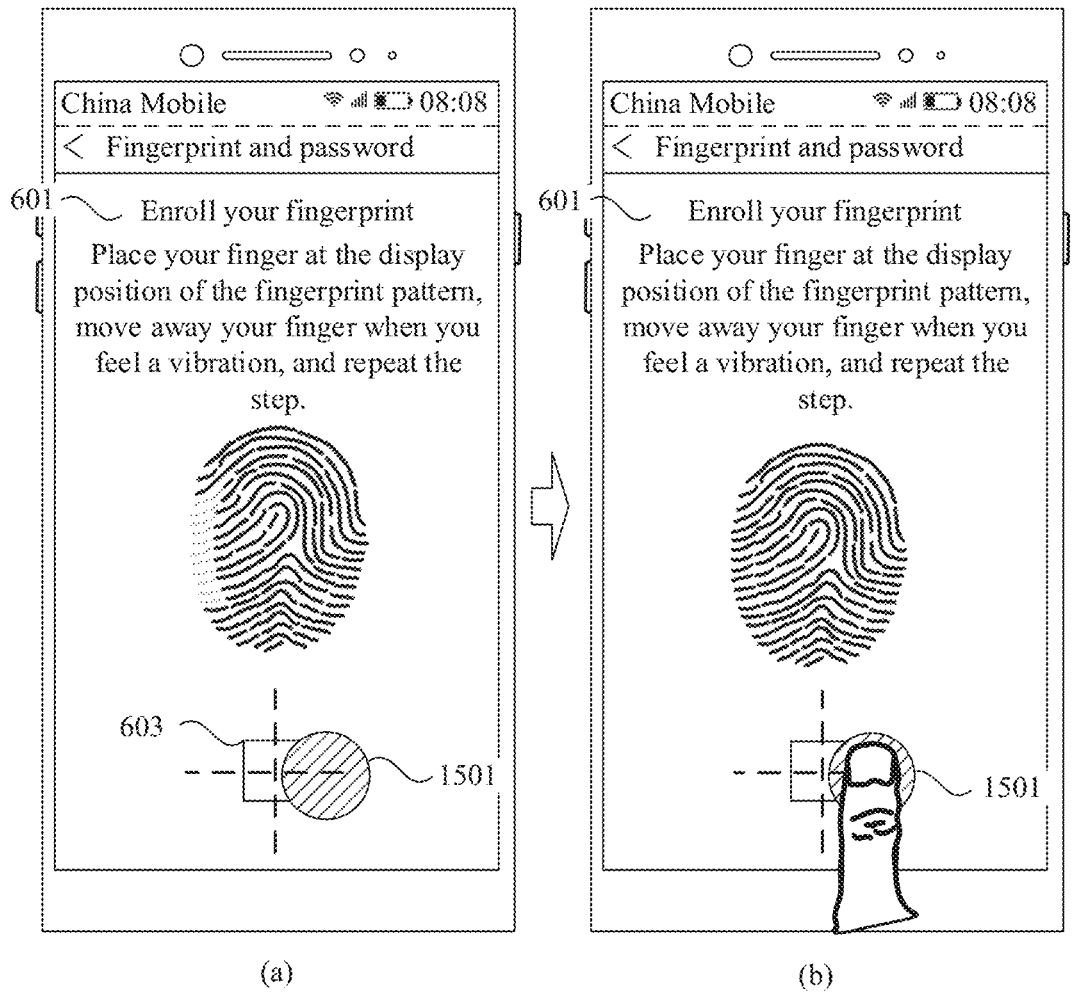
FIG. 15 is a twelfth schematic diagram of a display interface of a device according to an embodiment of this application.
Figure 16:
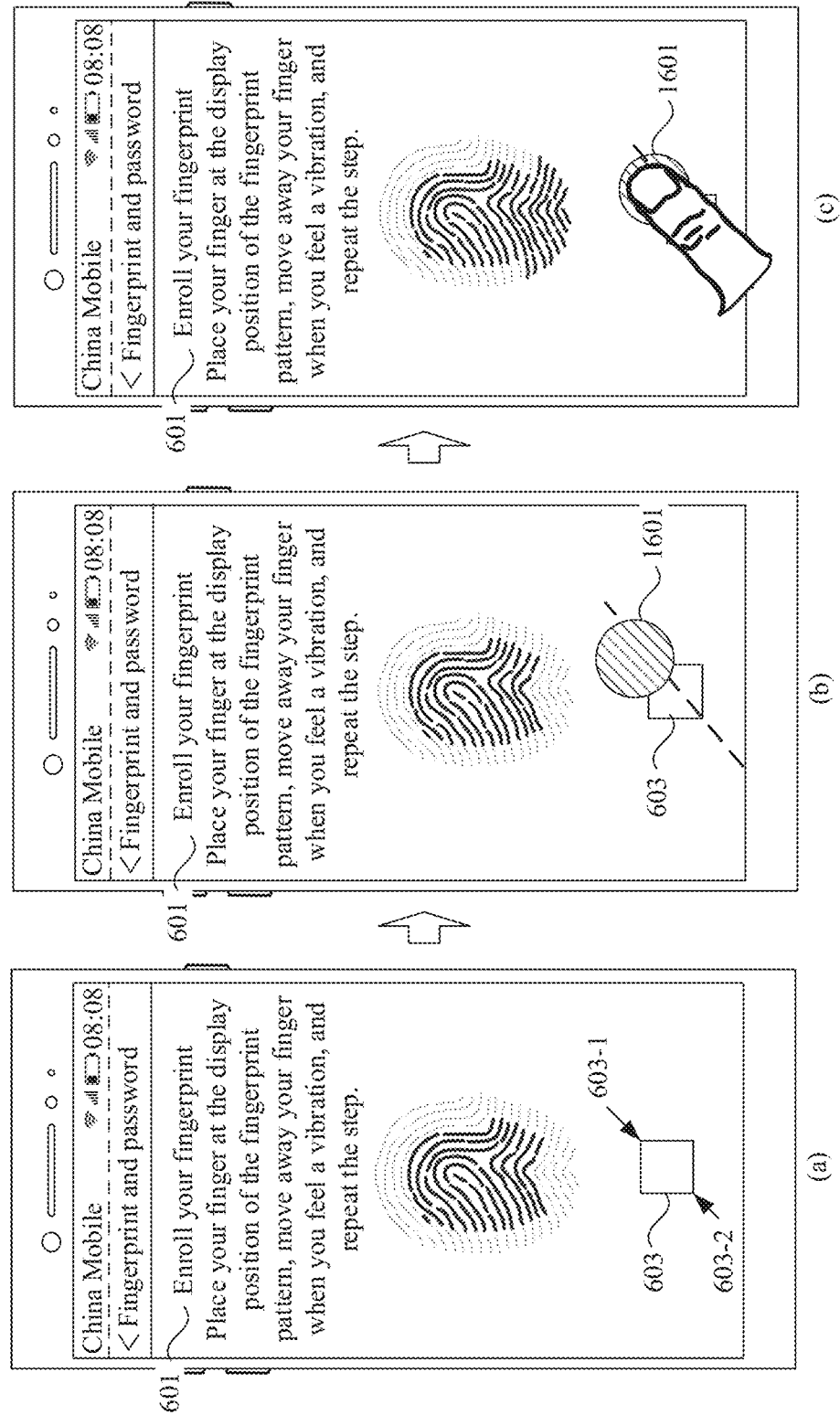
FIG. 16 is a thirteenth schematic diagram of a display interface of a device according to an embodiment of this application.
Figure 17:
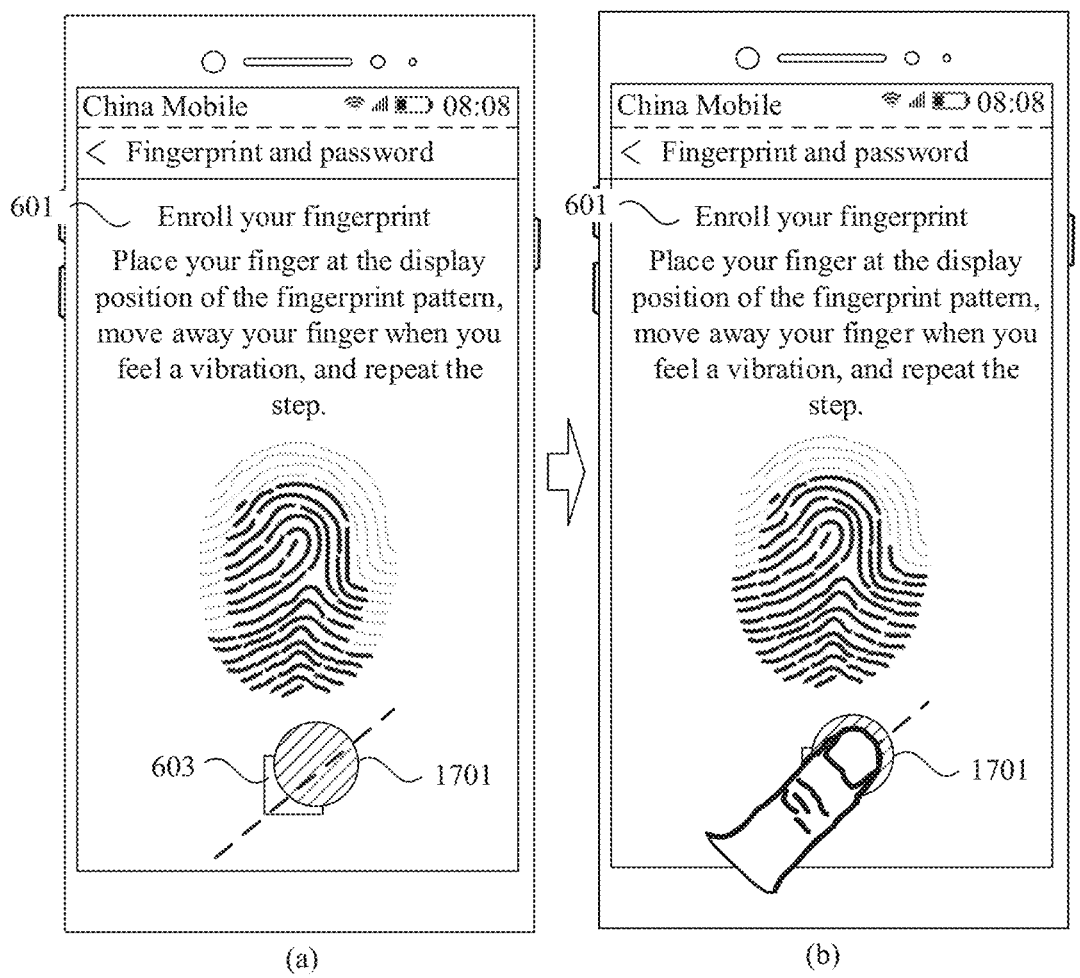
FIG. 17 is a fourteenth schematic diagram of a display interface of a device according to an embodiment of this application.
Figure 18:
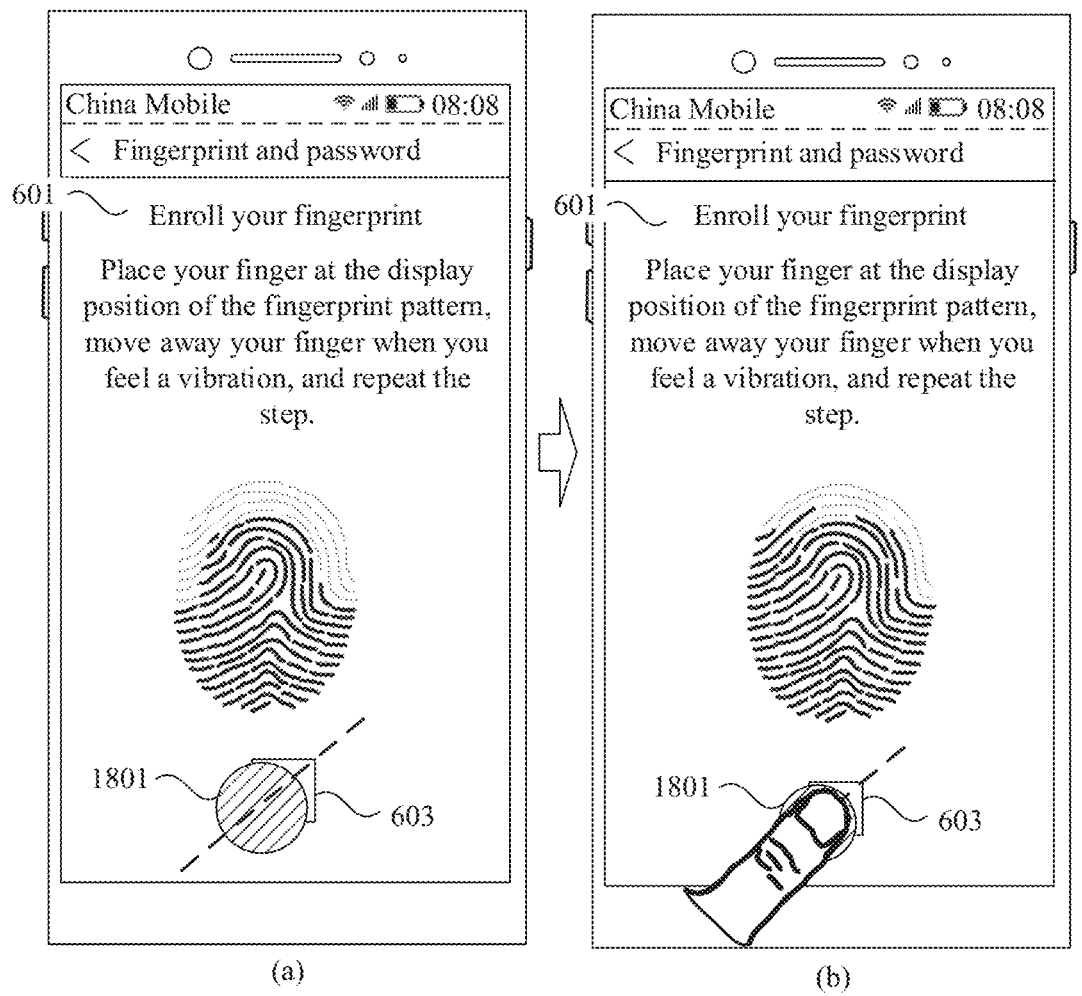
FIG. 18 is a fifteenth schematic diagram of a display interface of a device according to an embodiment of this application.
Figure 19:
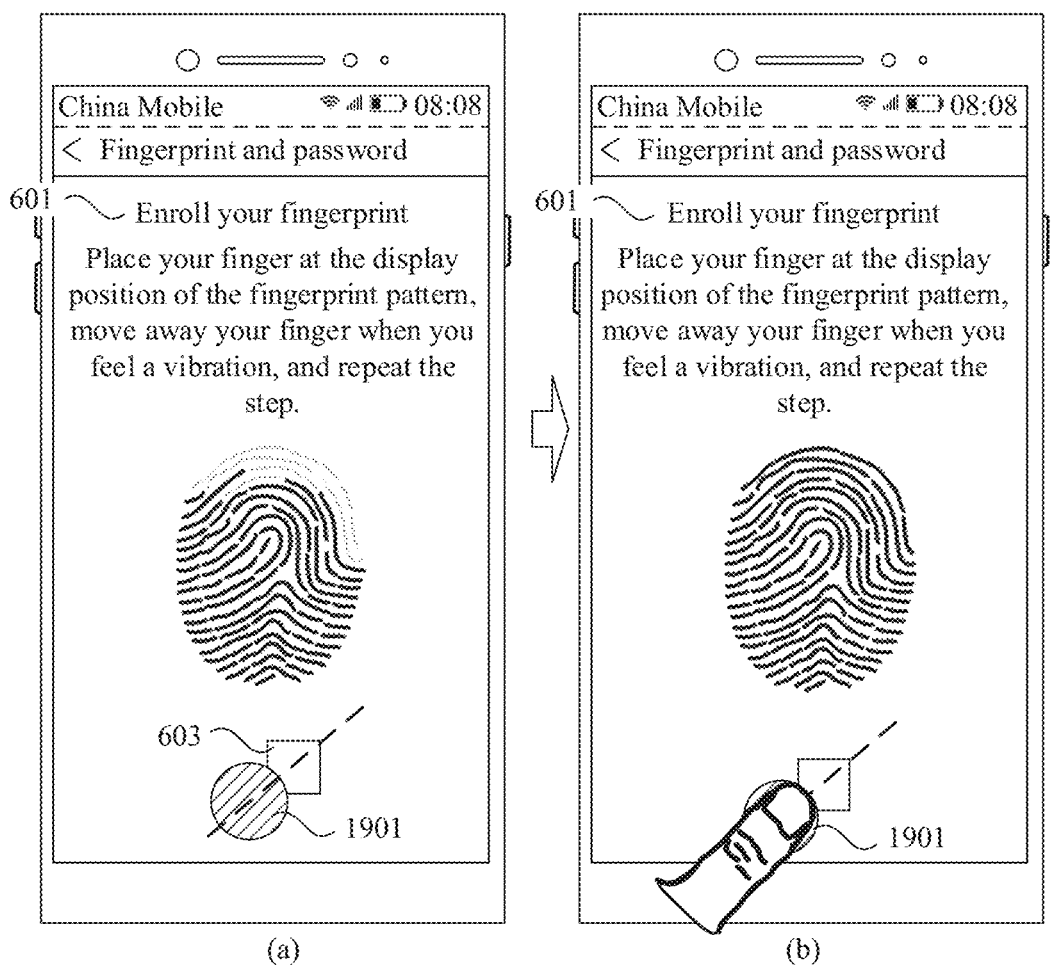
FIG. 19 is a sixteenth schematic diagram of a display interface of a device according to an embodiment of this application.
Figure 20:
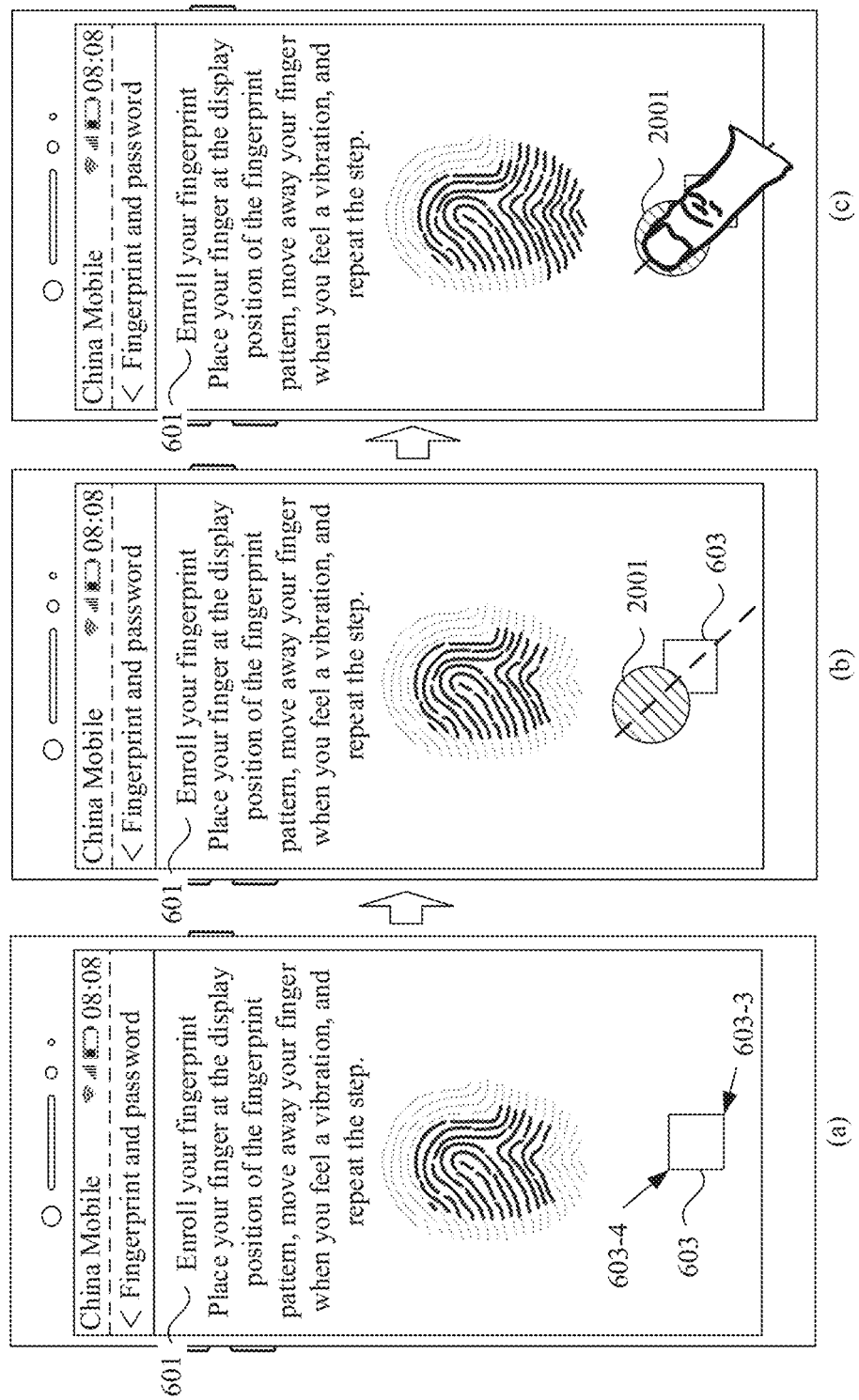
FIG. 20 is a seventeenth schematic diagram of a display interface of a device according to an embodiment of this application.
Figure 21:
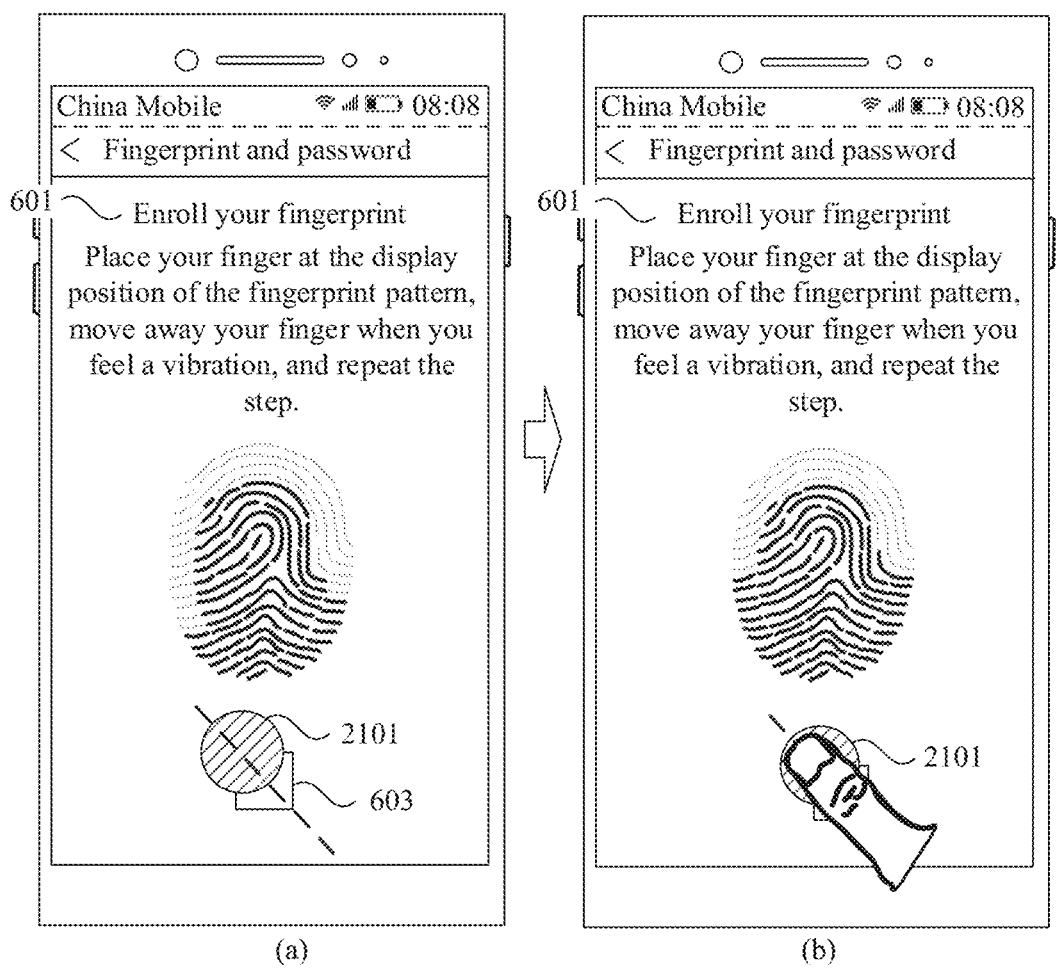
FIG. 21 is an eighteenth schematic diagram of a display interface of a device according to an embodiment of this application.
Figure 22:
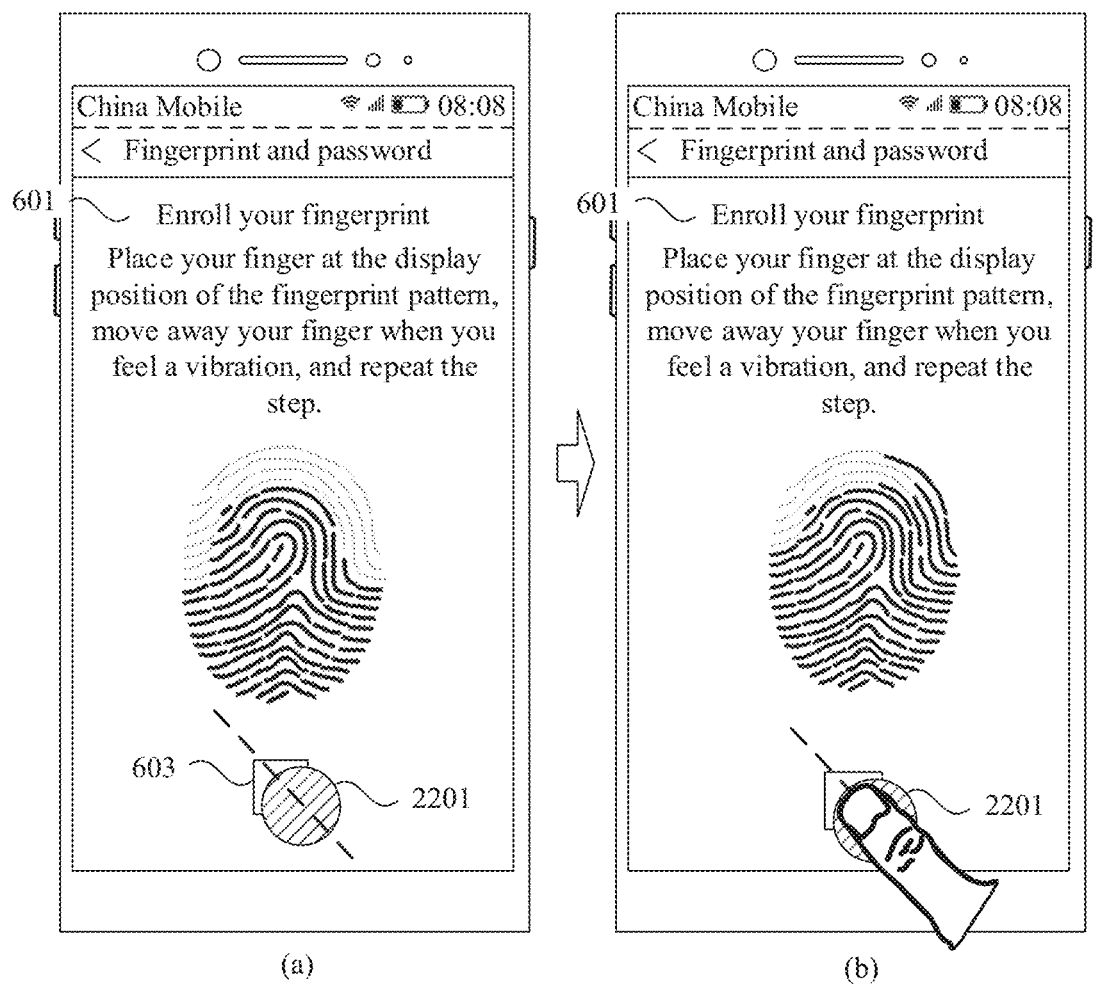
FIG. 22 is a nineteenth schematic diagram of a display interface of a device according to an embodiment of this application.
Figure 23:
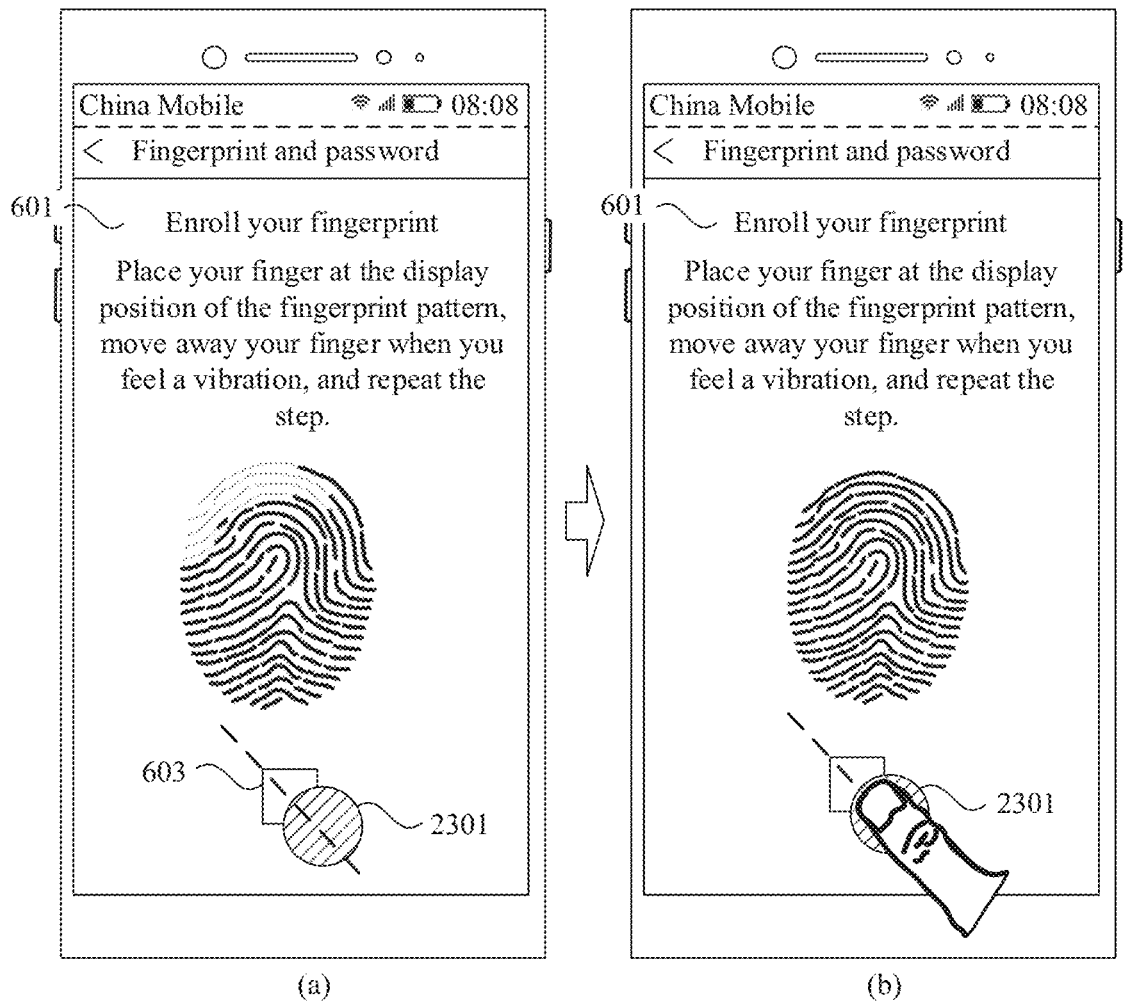
FIG. 23 is a twentieth schematic diagram of a display interface of a device according to an embodiment of this application.

With reference to FIG. 6, as shown in (a) in FIG. 12, after the fingerprint information of the middle position of the finger of the user is enrolled by displaying the fingerprint pattern 602, the fingerprint enrollment interface 601 may not display the fingerprint pattern 602. Instead, as shown in FIG. 12 to FIG. 15, the terminal sequentially displays a fingerprint pattern 1201, a fingerprint pattern 1301, a fingerprint pattern 1401, and a fingerprint pattern 1501 in the fingerprint enrollment interface 601 on the cross line with the fingerprint collection area 603 as a center, so that the user sequentially touches display positions of the fingerprint pattern 1201, the fingerprint pattern 1301, the fingerprint pattern 1401, and the fingerprint pattern 1501, and fingerprint information of the corresponding positions may be sequentially enrolled into the terminal. It may be learned that, in the fingerprint pattern 1201, the fingerprint pattern 1301, the fingerprint pattern 1401, and the fingerprint pattern 1501, different fingerprint patterns have different overlapping areas with the fingerprint collection area 603. In this way, the terminal can obtain a plurality of pieces of fingerprint information of edge positions of the finger of the user. The terminal may further generate a fingerprint template of the finger based on all the enrolled fingerprint information and save the fingerprint template, for subsequent authentication.

Implementation 3: For example, the terminal displays a fingerprint pattern at another position with reference to information about a finger used by the user to touch a fingerprint pattern, to instruct the user to enroll fingerprint information of an edge position of the finger.

With reference to FIG. 16 to FIG. 19, it is assumed that the finger used by the user to touch the fingerprint pattern is a left thumb. With reference to FIG. 6, as shown in (a) in FIG. 16, after the fingerprint information of the middle position of the finger of the user is enrolled by displaying the fingerprint pattern 602, the fingerprint enrollment interface 601 may not display the fingerprint pattern 602. In addition, the terminal may determine a type of the finger used to touch the fingerprint pattern 602. When it is determined that the type of the finger used to touch the fingerprint pattern 602 is the left thumb, as shown in (a) in FIG. 16, the terminal may sequentially display other fingerprint patterns on a straight line determined based on a top right corner 603-1 and a bottom left corner 603-2 of the fingerprint collection area 603, to instruct the user to enroll the fingerprint information of the edge position of the finger. For example, as shown in FIG. 16 to FIG. 19, the terminal sequentially displays a fingerprint pattern 1601, a fingerprint pattern 1701, a fingerprint pattern 1801, and a fingerprint pattern 1901 in the fingerprint enrollment interface 601 on the straight line determined based on the top right corner 603-1 and the bottom left corner 603-2 of the fingerprint collection area 603, so that the user sequentially touches display positions of the fingerprint pattern 1601, the fingerprint pattern 1701, the fingerprint pattern 1801, and the fingerprint pattern 1901, and fingerprint information of the corresponding positions may be sequentially enrolled into the terminal. It may be learned that, in the fingerprint pattern 1601, the fingerprint pattern 1701, the fingerprint pattern 1801, and the fingerprint pattern 1901, different fingerprint patterns have different overlapping areas with the fingerprint collection area 603. In this way, the terminal can obtain a plurality of pieces of fingerprint information of edge positions of the finger of the user. The terminal may further generate a fingerprint template of the finger based on all the enrolled fingerprint information and save the fingerprint template, for subsequent authentication.

With reference to FIG. 20 to FIG. 23, it is assumed that the finger used by the user to touch the fingerprint pattern is a right thumb. With reference to FIG. 6, as shown in (a) in FIG. 20, after the fingerprint information of the middle position of the finger of the user is enrolled by displaying the fingerprint pattern 602, the fingerprint enrollment interface 601 may not display the fingerprint pattern 602. In addition, the terminal may determine a type of the finger used to touch the fingerprint pattern 602. When it is determined that the type of the finger used to touch the fingerprint pattern 602 is the right thumb, as shown in (a) in FIG. 20, the terminal may sequentially display other fingerprint patterns on a straight line determined based on a bottom right corner 603-3 and a top left corner 603-4 of the fingerprint collection area 603, to instruct the user to enroll the fingerprint information of the edge position of the finger. For example, as shown in FIG. 20 to FIG. 23, the terminal sequentially displays a fingerprint pattern 2001, a fingerprint pattern 2101, a fingerprint pattern 2201, and a fingerprint pattern 2301 in the fingerprint enrollment interface 601 on the straight line determined based on the bottom right corner 603-3 and the top left corner 603-4 of the fingerprint collection area 603, so that the user sequentially touches display positions of the fingerprint pattern 2001, the fingerprint pattern 2101, the fingerprint pattern 2201, and the fingerprint pattern 2301, and fingerprint information of the corresponding positions may be sequentially enrolled into the terminal. It may be learned that, in the fingerprint pattern 2001, the fingerprint pattern 2101, the fingerprint pattern 2201, and the fingerprint pattern 2301, different fingerprint patterns have different overlapping areas with the fingerprint collection area 603. In this way, the terminal can obtain a plurality of pieces of fingerprint information of edge positions of the finger of the user. The terminal may further generate a fingerprint template of the finger based on all the enrolled fingerprint information and save the fingerprint template, for subsequent authentication.

Figure 24:
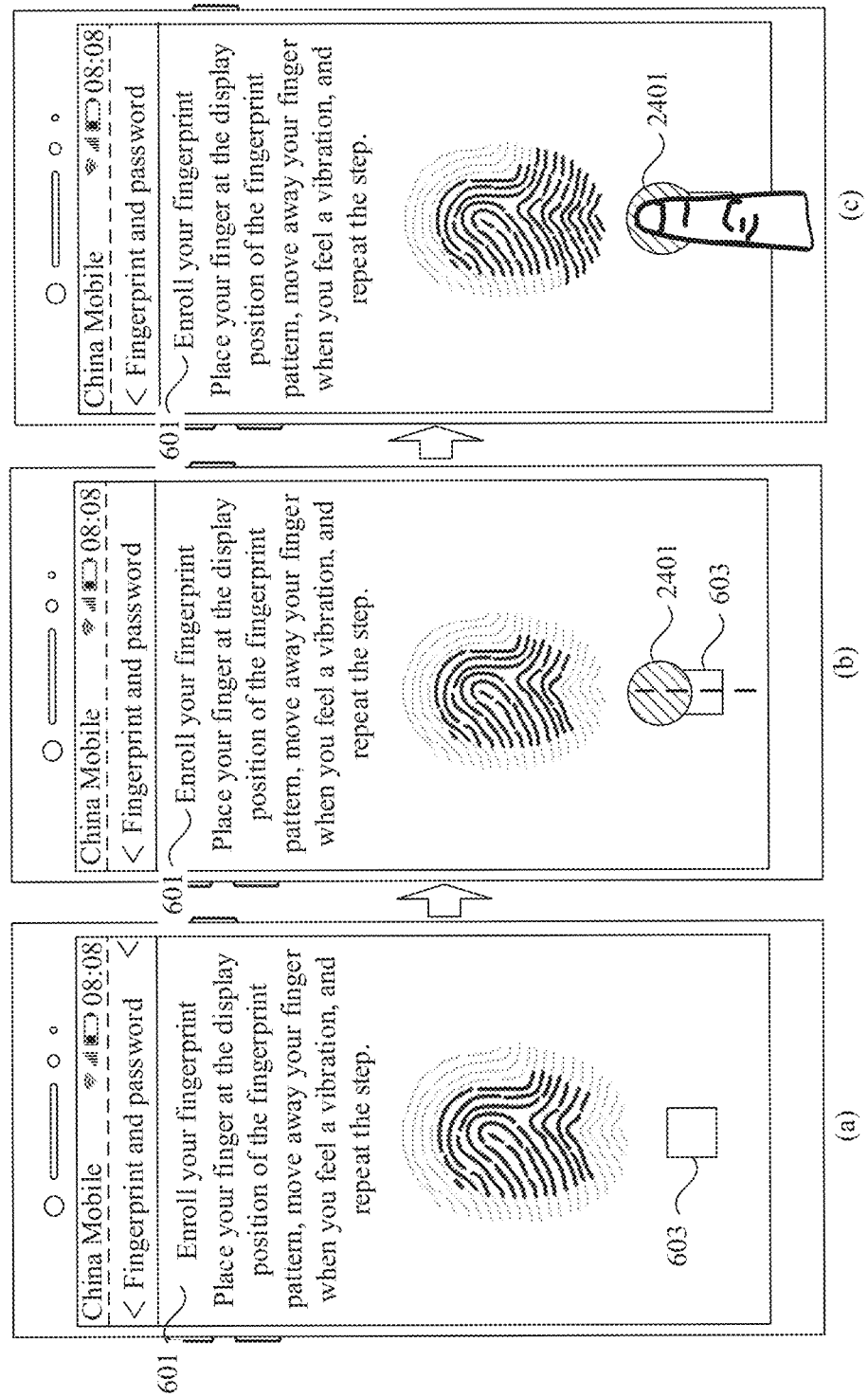
FIG. 24 is a twenty-first schematic diagram of a display interface of a device according to an embodiment of this application.
Figure 25:
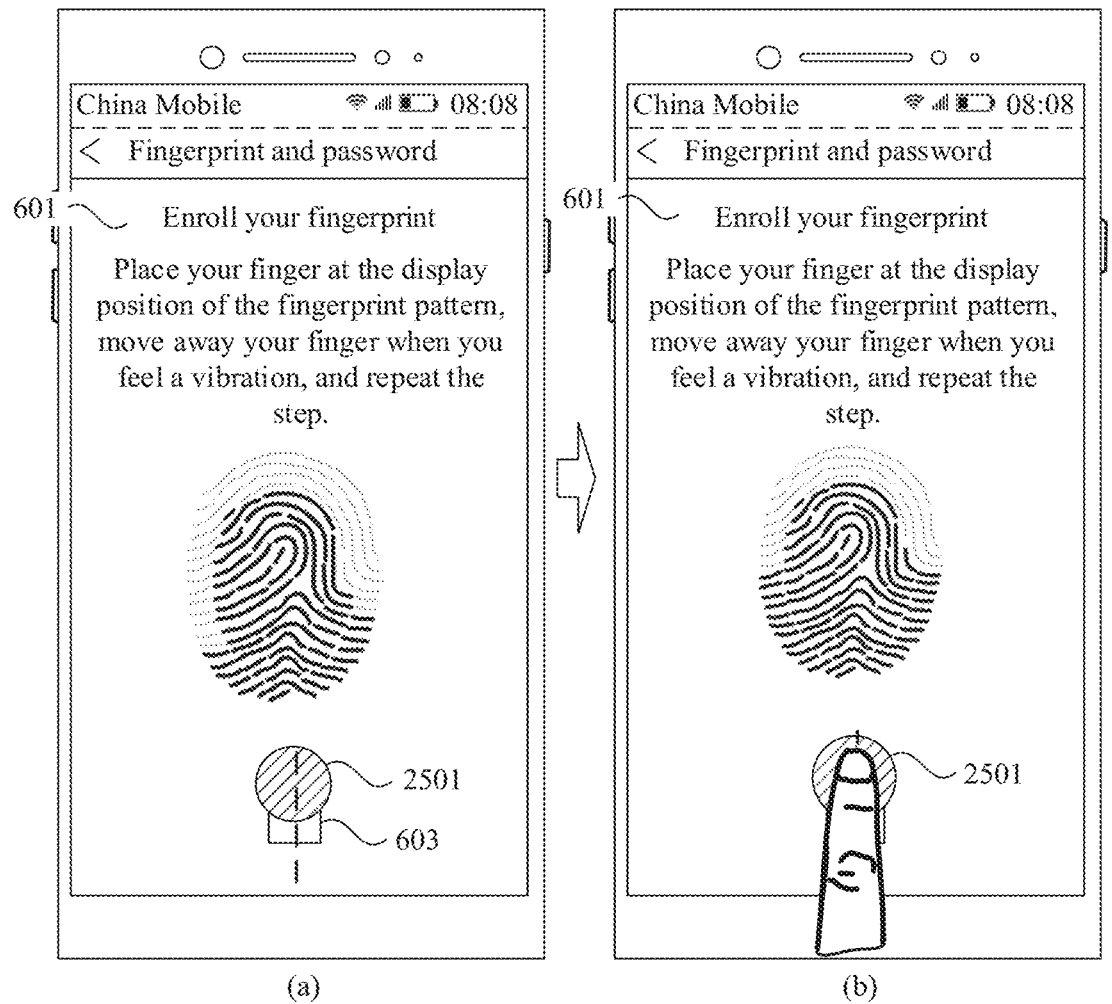
FIG. 25 is a twenty-second schematic diagram of a display interface of a device according to an embodiment of this application.
Figure 26:
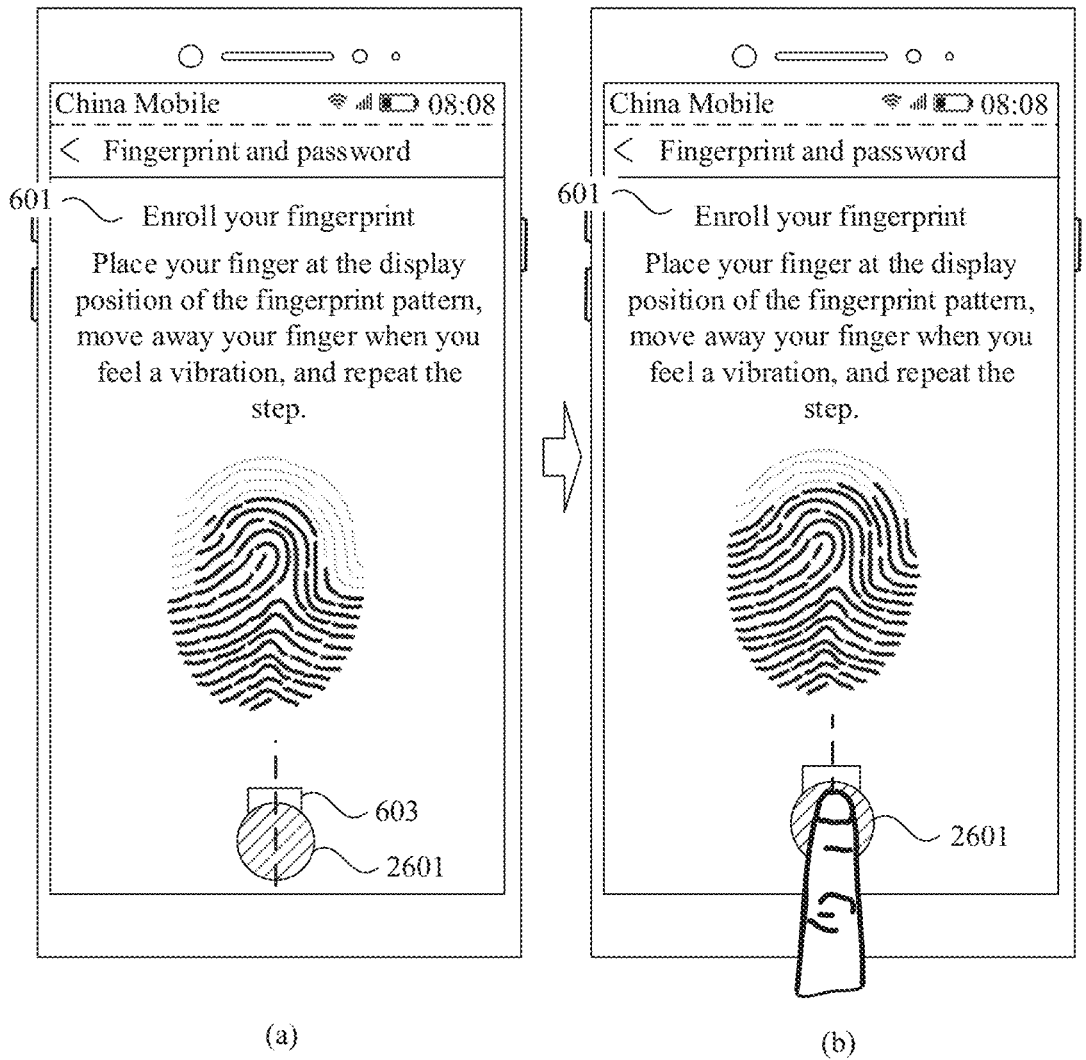
FIG. 26 is a twenty-third schematic diagram of a display interface of a device according to an embodiment of this application.
Figure 27:
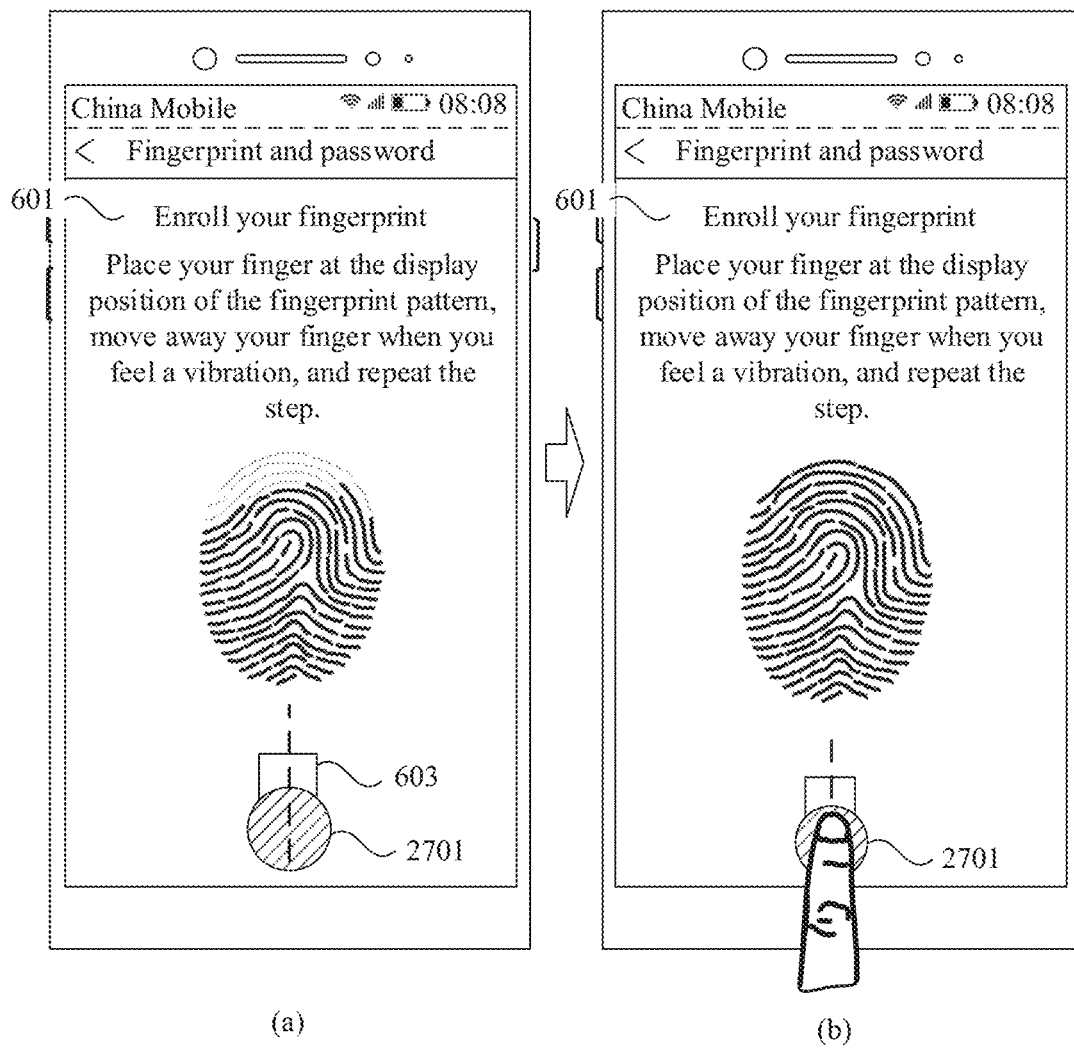
FIG. 27 is a twenty-third schematic diagram of a display interface of a device according to an embodiment of this application.

With reference to FIG. 24 to FIG. 27, it is assumed that the finger used by the user to touch the fingerprint pattern is an index finger With reference to FIG. 6, as shown in (a) in FIG. 24, after the fingerprint information of the middle position of the finger of the user is enrolled by displaying the fingerprint pattern 602, the fingerprint enrollment interface 601 may not display the fingerprint pattern 602. In addition, the terminal may determine a type of the finger used to touch the fingerprint pattern 602. When it is determined that the type of the finger used to touch the fingerprint pattern 602 is the index finger, as shown in FIG. 24 to FIG. 27, the terminal may sequentially display other fingerprint patterns on a vertical line passing through the center of the fingerprint collection area 603, to instruct the user to enroll the fingerprint information of the edge position of the finger. For example, as shown in FIG. 24 to FIG. 27, the terminal sequentially displays a fingerprint pattern 2401, a fingerprint pattern 2501, a fingerprint pattern 2601, and a fingerprint pattern 2701 in the fingerprint enrollment interface 601 on the vertical line passing through the center of the fingerprint collection area 603, so that the user sequentially touches display positions of the fingerprint pattern 2401, the fingerprint pattern 2501, the fingerprint pattern 2601, and the fingerprint pattern 2701, and fingerprint information of the corresponding positions may be sequentially enrolled into the terminal. It may be learned that, in the fingerprint pattern 2401, the fingerprint pattern 2501, the fingerprint pattern 2601, and the fingerprint pattern 2701, different fingerprint patterns have different overlapping areas with the fingerprint collection area 603. In this way, the terminal can obtain a plurality of pieces of fingerprint information of edge positions of the finger of the user. The terminal may further generate a fingerprint template of the finger based on all the enrolled fingerprint information and save the fingerprint template, for subsequent authentication.

In some embodiments, a specific implementation in which the terminal determines a type of a finger may be: the terminal first determines whether the user touches the fingerprint pattern with a left hand or a right hand, and then determines whether the type of the finger used by the user to touch the fingerprint pattern is a thumb or the terminal first determines whether the type of the finger used by the user to touch the fingerprint pattern is a thumb, and if the terminal determines that the type of the finger is a thumb, the terminal then determines whether the user touches the fingerprint pattern with a left hand or a right hand. If it is determined that the type of the finger is an index finger, it may be directly determined that other fingerprint patterns may be sequentially displayed on the vertical line passing through the center of the fingerprint collection area.

In an alternative implementation, the terminal may alternatively display other fingerprint patterns based only on whether the user touches the fingerprint pattern with a left hand or a right hand, to enroll fingerprint information of the edge position of the finger of the user. Determining whether the left hand or the right hand is used belongs to the prior art, and may be implemented through many solutions, for example, by detecting a holding position of the user, or by determining a finger contact shape, position, or the like of the user. Details are not described herein again. For example, if the user touches the fingerprint pattern with the right hand, display positions of other fingerprint patterns may be on the left side of the vertical line passing through the center of the fingerprint collection area; or if the user touches the fingerprint pattern with the left hand, display positions of other fingerprint patterns are on the right side of the vertical line passing through the center of the fingerprint collection area. Specific descriptions thereof are similar to specific descriptions of corresponding content in the foregoing implementation, and details are not described herein again.

In another alternative implementation, the terminal may further determine a position of an unsuccessfully enrolled fingerprint based on enrollment quality of the enrolled fingerprint information of the middle position of the finger, and determine, based on the position of the unsuccessfully enrolled fingerprint, how to instruct, by displaying a fingerprint pattern at another position, the user to enroll fingerprint information of an edge position of the finger.

It should be noted that, as shown in the examples of the implementations 2 to 4 of this embodiment of this application, a quantity of fingerprint patterns used for enrolling the fingerprint information of the edge position of the finger is 4. However, in this embodiment of this application, the quantity of fingerprint patterns used for enrolling the fingerprint information of the edge position of the finger is not specifically limited and a display position of a first displayed fingerprint pattern is not specifically limited. The quantity of fingerprint patterns used for enrolling the fingerprint information of the edge position of the finger and the display position of the first displayed fingerprint pattern may be set based on a requirement of an actual application scenario. In addition, for a specific process of displaying a fingerprint pattern and collecting fingerprint information by the terminal when the user touches the fingerprint pattern in the implementations 2 to 4, refer to specific descriptions of corresponding content in the implementation 1 in this embodiment of this application. Details are not described again in this embodiment of this application.

Figure 28:
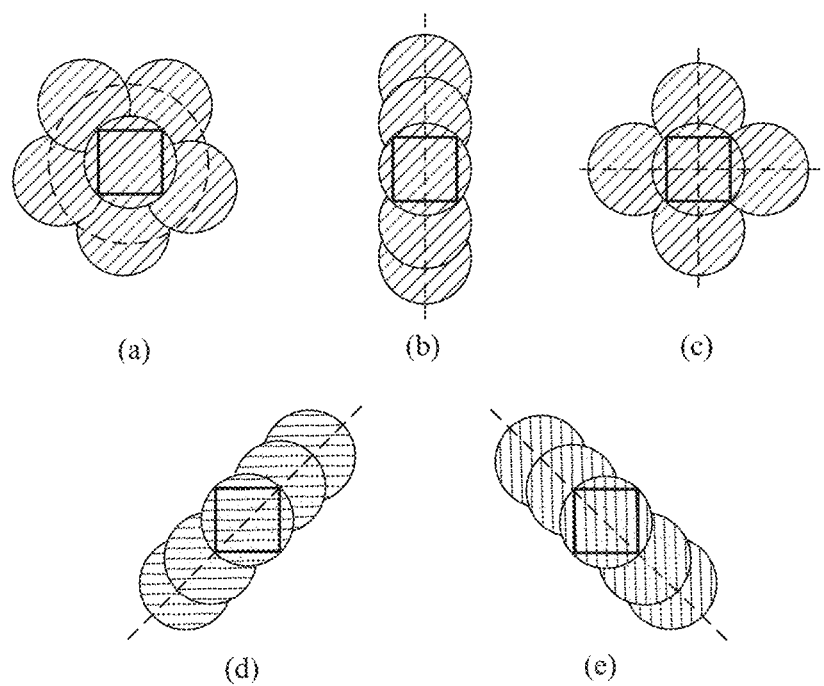
FIG. 28 is a twenty-fourth schematic diagram of a display interface of a device according to an embodiment of this application.

In all the foregoing examples, S403 and S404 are specifically described by using an example in which the terminal sequentially displays at least two fingerprint patterns in the fingerprint enrollment interface, to enroll fingerprint t information. In this embodiment of this application, the at least two fingerprint patterns may alternatively be simultaneously displayed. For example, as shown in FIG. 28, (a) in FIG. 28 shows that the at least two simultaneously displayed fingerprint patterns are specifically: one fingerprint pattern whose center overlaps the center of the fingerprint collection area, and a plurality of fingerprint patterns located on the circular line with the fingerprint collection area as a center. (b) in FIG. 28 shows that the at least two simultaneously displayed fingerprint patterns are specifically a plurality of fingerprint patterns located on the vertical line passing through the center of the fingerprint collection area. (c) in FIG. 28 shows that the at least two simultaneously displayed fingerprint patterns are specifically: one fingerprint pattern whose center overlaps the center of the fingerprint collection area, and a plurality of fingerprint patterns located on the cross line with the fingerprint collection area as a center. (d) in FIG. 28 shows that the at least two simultaneously displayed fingerprint patterns are specifically a plurality of fingerprint patterns located on the straight line determined based on the top right corner and the bottom left corner of the fingerprint collection area, (e) in FIG. 28 shows that the at least two simultaneously displayed fingerprint patterns are specifically a plurality of fingerprint patterns located on the straight line determined based on the bottom right corner and the top left corner of the fingerprint collection area.

Figure 29:
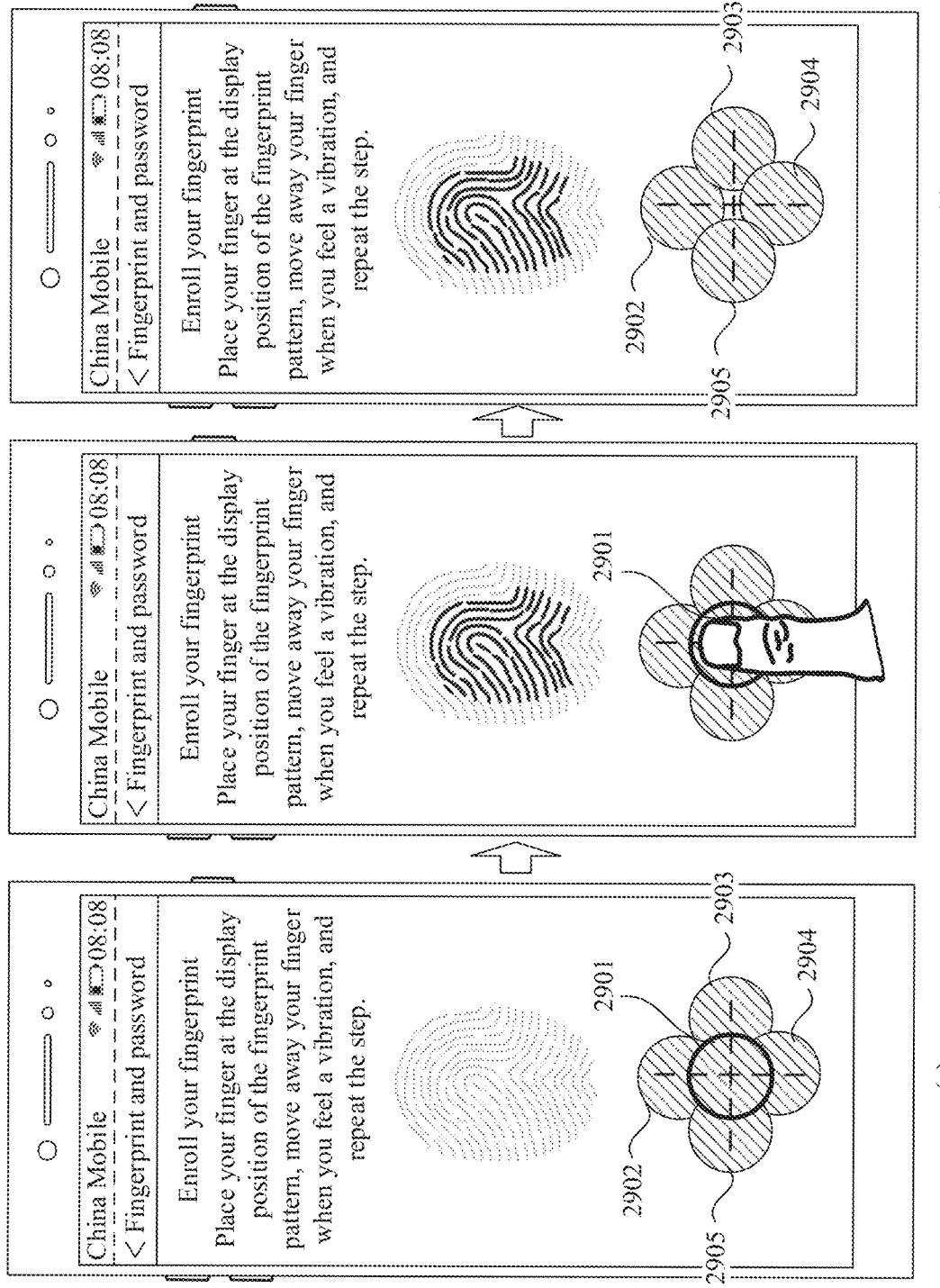
FIG. 29 is a twenty-fifth schematic diagram of a display interface of a device according to an embodiment of this application.
Figure 30:
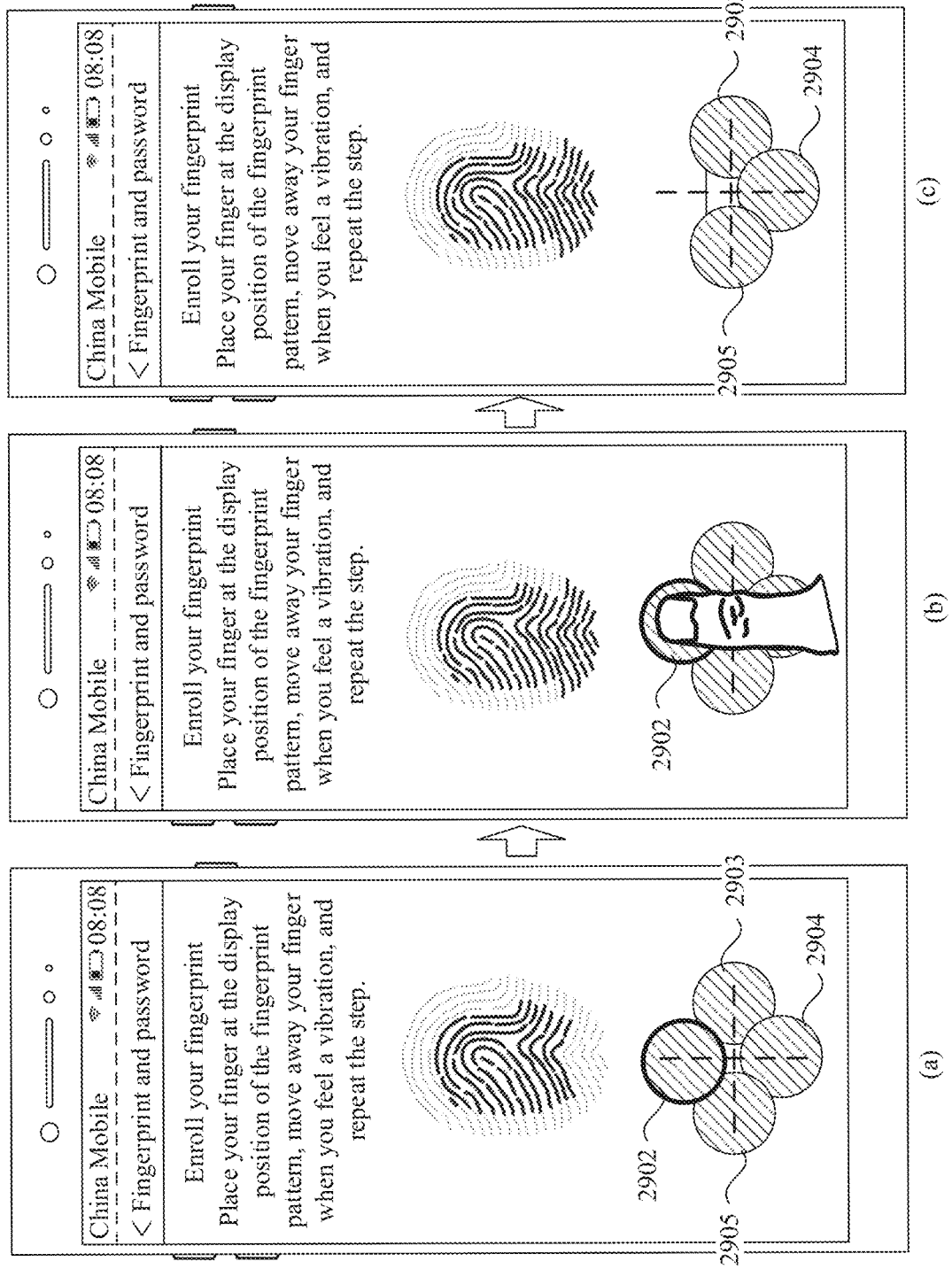
FIG. 30 is a twenty-sixth schematic diagram of a display interface of a device according to an embodiment of this application.

With reference to FIG. 28, when at least two fingerprint patterns are simultaneously displayed in the fingerprint enrollment interface, that the simultaneously displayed at least two fingerprint patterns are specifically: one fingerprint pattern whose center overlaps the center of the fingerprint collection area, and a plurality of fingerprint patterns located on the circular line with the fingerprint collection area as a center is used as an example, as shown in FIG. 29 and FIG. 30, the terminal may use a special display effect, for example, a bright or special color, or a flickering manner, to prompt a sequence of touching the displayed fingerprint patterns by the user. As shown in (a) in FIG. 29, in the fingerprint enrollment interface displayed in response to the first input of the user, the terminal simultaneously displays five fingerprint patterns: a fingerprint pattern 2901, a fingerprint pattern 2902, a fingerprint pattern 2903, a fingerprint pattern 2904, and a fingerprint pattern 2905. In addition, the terminal displays the fingerprint pattern 2901 through flickering, to instruct the user to touch the fingerprint pattern 2901. As shown in (b) in FIG. 29, when the user touches a display position of the fingerprint pattern 2901 with a finger, fingerprint information of a corresponding position may be enrolled into the terminal. After the user touches the display position of the fingerprint pattern 2901 with the finger, or a fingerprint at the corresponding position of the display position of the fingerprint pattern 2901 is successfully enrolled, as shown in (c) in FIG. 29, the terminal no longer displays the fingerprint pattern 2901, and continues to display the fingerprint pattern 2902, the fingerprint pattern 2903, the fingerprint pattern 2904, and the fingerprint pattern 2905. Further, as shown in FIG. 30, the terminal displays the fingerprint pattern 2902 through flickering, to instruct the user to touch the fingerprint pattern 2902. As shown in (b) in FIG. 30, when the user touches a display position of the fingerprint pattern 2902 with a finger, fingerprint information of a corresponding position may be enrolled into the terminal. After the user touches the display position of the fingerprint pattern 2902 with the finger, or a fingerprint at the corresponding position of the display position of the fingerprint pattern 2902 is successfully enrolled, as shown in (c) in FIG. 30, the terminal no longer displays the fingerprint pattern 2902, and continues to display the fingerprint pattern 2903, the fingerprint pattern 2904, and the fingerprint pattern 2905. Subsequently, the terminal may further continue to display other remaining fingerprint patterns through flickering, to instruct the user to sequentially enroll fingerprint information of other positions, until all fingerprint information of corresponding positions of the fingerprint patterns is enrolled. In this case, the terminal may generate a fingerprint template of the finger based on all the enrolled fingerprint information and save the fingerprint template, for subsequent authentication.

Figure 31:
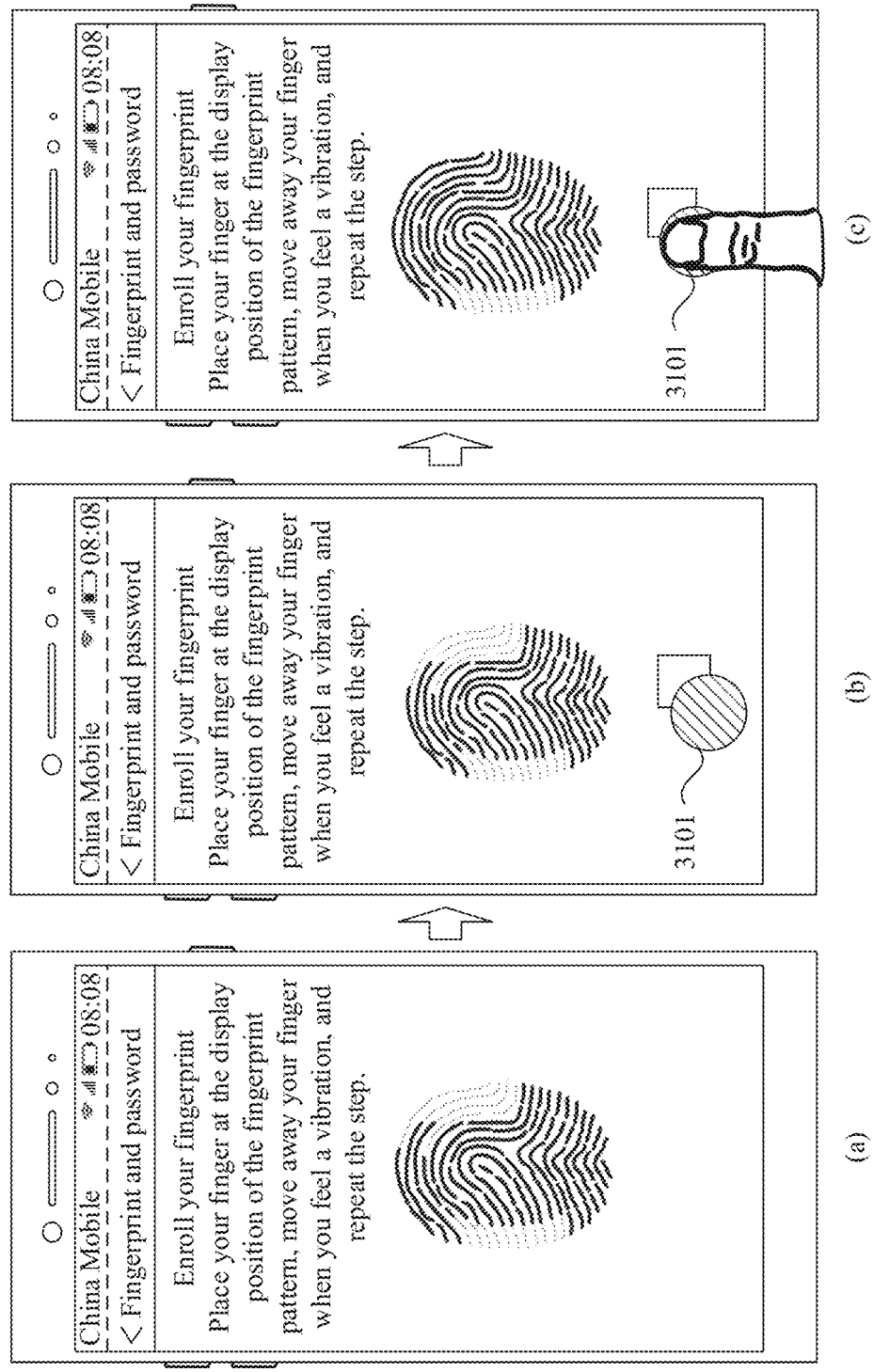
FIG. 31 is a twenty-seventh schematic diagram of a display interface of a device according to an embodiment of this application.
Figure 32:
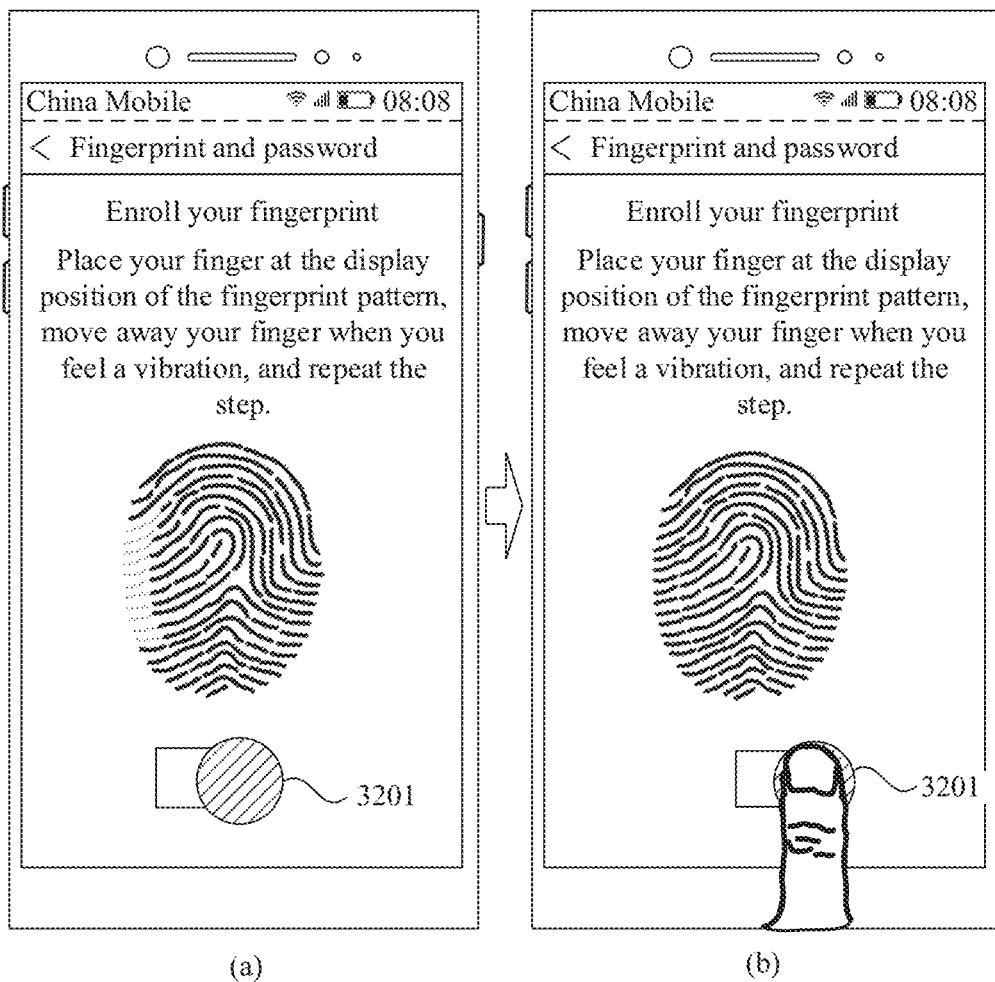
FIG. 32 is a twenty-eighth schematic diagram of a display interface of a device according to an embodiment of this application.

Further, after the user enrolls fingerprint information based on the display positions of the fingerprint patterns shown in FIG. 6 to FIG. 30, the terminal may further determine, based on enrollment quality of all the enrolled fingerprint information, which part of fingerprint information is unsuccessfully enrolled, and determine, based on a position of the successfully enrolled fingerprint information, a display position of a fingerprint pattern that further needs to be displayed, to supplement the fingerprint information. With reference to FIG. 31 and FIG. 32, for example, the terminal determines that two parts of fingerprint information are still unsuccessfully enrolled. In this case, based on positions of the two parts of fingerprint information, it is determined that display positions of fingerprint patterns that need to be displayed are: a position of the fingerprint pattern 3101 shown in (b) in FIG. 31, and a position of a fingerprint pattern 3201 shown in (a) in FIG. 32. In this way, the terminal can supplement the fingerprint information of the corresponding position by displaying the fingerprint pattern 3101 and the fingerprint pattern 3201, and update, h using the supplemented fingerprint information, the fingerprint template generated based on the fingerprint information enrolled at the display positions of the fingerprint patterns shown in FIG. 6 to FIG. 30, to obtain a more accurate fingerprint template.

Figure 33:
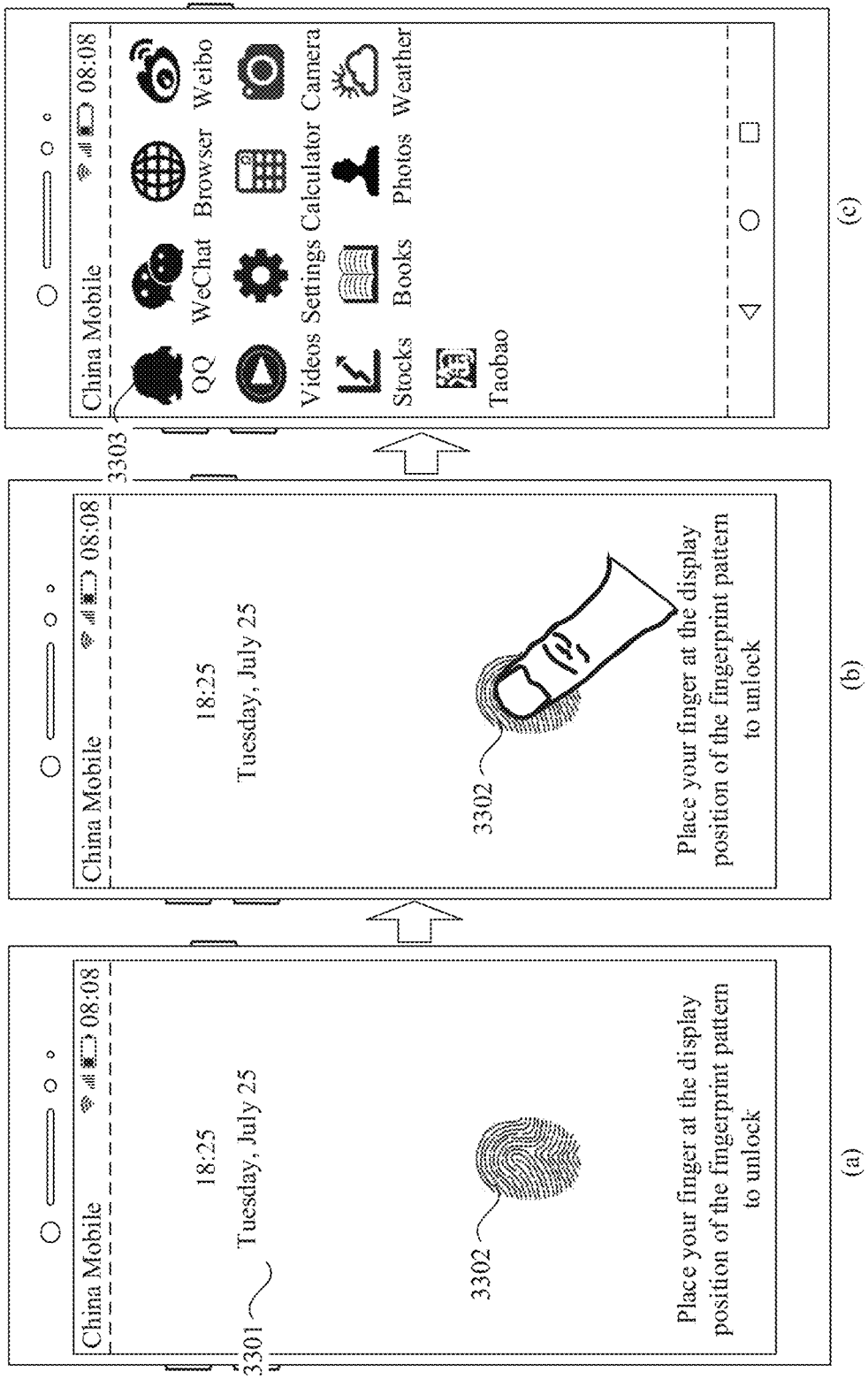
FIG. 33 is a twenty-ninth schematic diagram of a display interface of a device according to an embodiment of this application.

After successfully enrolling the fingerprint of the user, and venerating and storing the fingerprint template, the terminal may perform authentication by using the stored fingerprint template. With reference to FIG. 33, that the mobile phone is unlocked by using the stored fingerprint template is used as an example. For example, as shown in (a) in FIG. 33, the mobile phone displays a pattern 3302 in an unlock interface 3301, and instructs the user to touch a display position of the pattern 3302 to unlock the mobile phone. As shown in in FIG. 33, the user touches the display position of the pattern 3302 with a finger, and the touchscreen collects fingerprint information of the user, and matches the collected fingerprint information with the stored fingerprint template. If the matching succeeds, the mobile phone is unlocked, and as shown in (c) in FIG. 33, a home screen 3303 of the mobile phone is displayed.

Figure 34A:
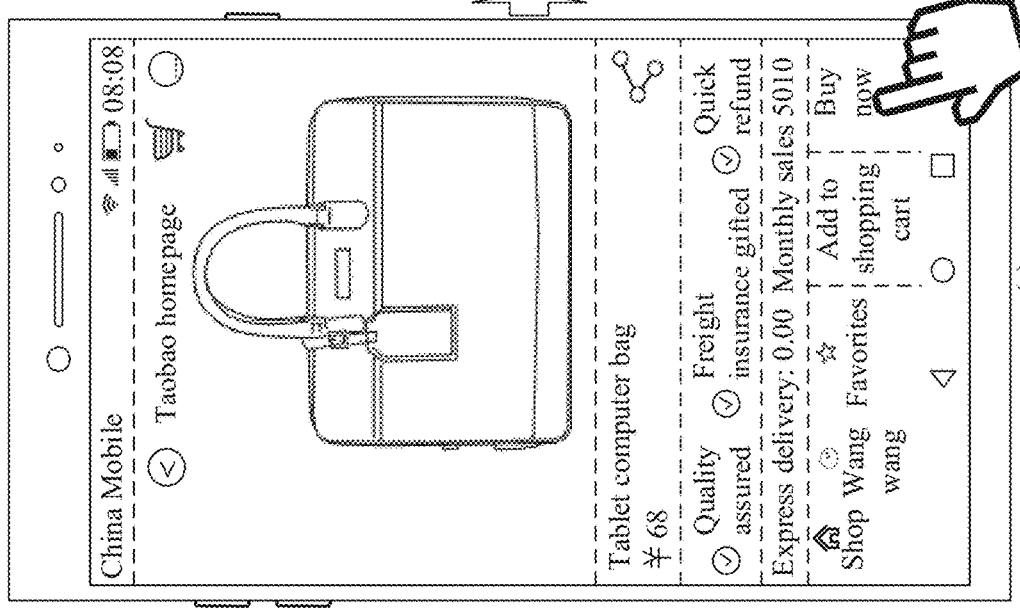
FIG. 34A and FIG. 34B are a thirtieth schematic diagram of a display interface of a device according to an embodiment of this application.
Figure 34A:
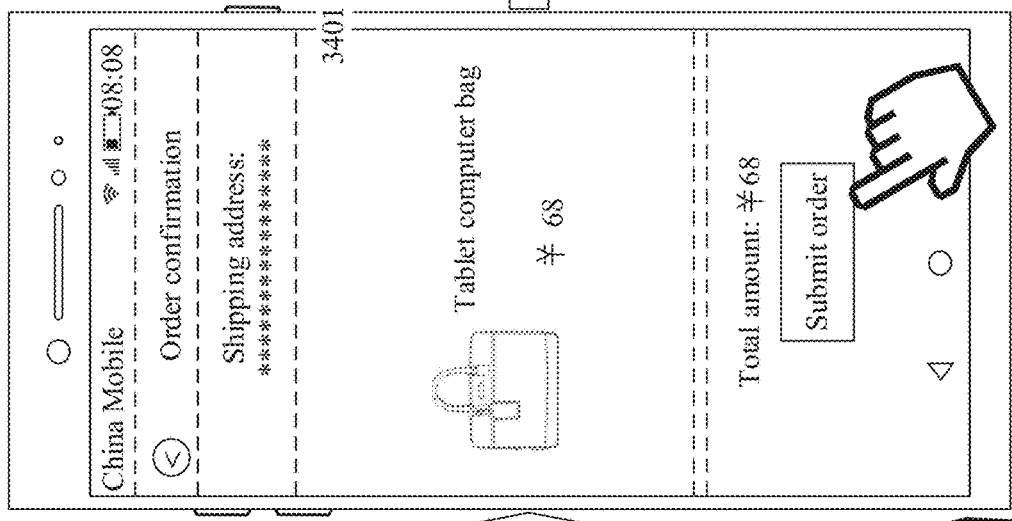
Figure 34A:
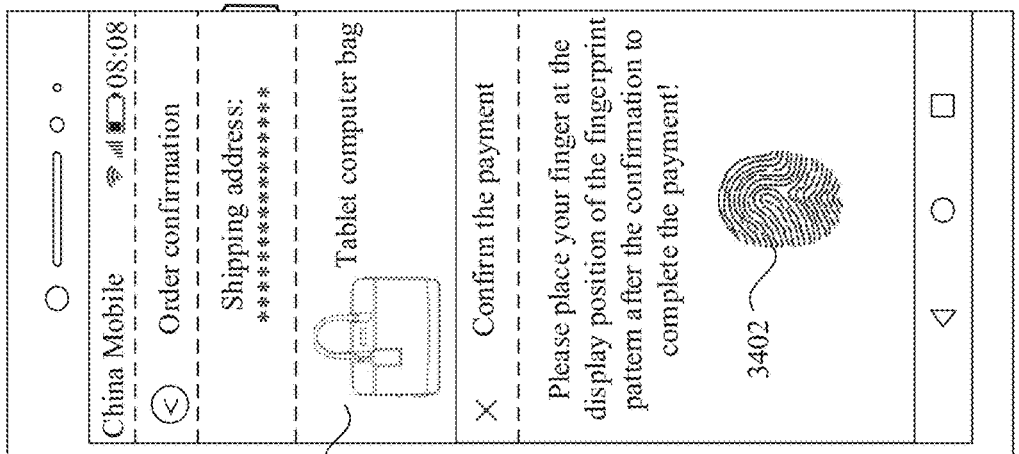
Figure 34B:
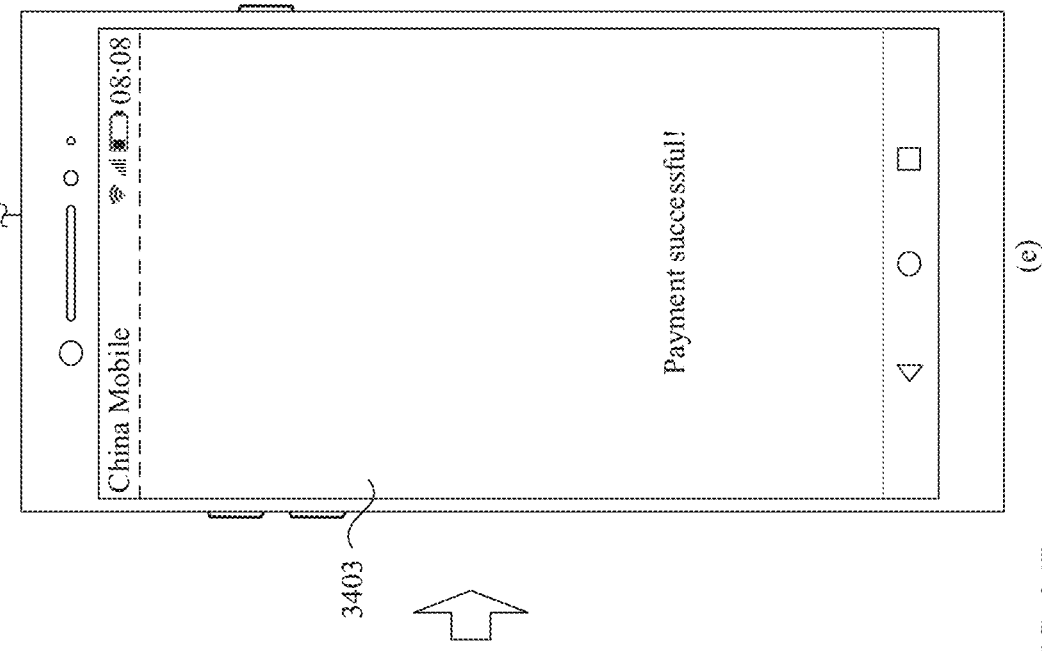
Figure 34B:
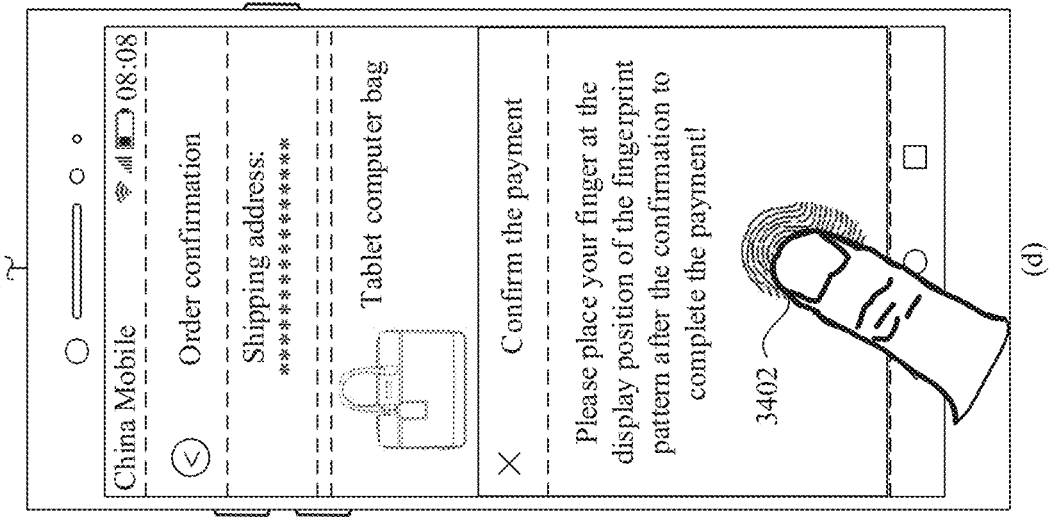

With reference to FIG. 34A and FIG. 34B, that payment is performed by using the stored fingerprint template is used as an example. For example, as shown in (a) and (b) in FIG. 34A and FIG. 34B, the user intends to buy an item in a Taobao application. After the item is selected and an order is submitted, as shown in (c) in FIG. 34A and FIG. 34B, the mobile phone displays a pop-up box 3401, and displays a pattern 3402 in the pop-up box 3401, to instruct the user to touch a display position of the pattern 3402 to complete payment. As shown in (d) in FIG. 34A and FIG. 34B, the user touches the display position of the pattern 3402 with a finger, and the touchscreen collects fingerprint information of the user, and matches the collected fingerprint information with the stored fingerprint template. If the matching succeeds, a payment operation is performed, and after the payment is completed, as shown in (c) in FIG. 34A and FIG. 34B, a payment success prompt interface 3403 is displayed.

It should be noted that, in this embodiment of this application, another authentication operation may further be performed by using the stored fingerprint template. Details are not described in this embodiment of this application.

In the fingerprint enrollment method provided in this embodiment of this application, after receiving the first input of the user, the terminal displays the fingerprint enrollment interface in response to the first input, displays, in the fingerprint enrollment interface, the at least two fingerprint patterns that at least partially overlap the fingerprint collection area of the touchscreen of the terminal, and instructs the user to touch the displayed fingerprint pattern. When the user touches the display position of the fingerprint pattern, the fingerprint information of the user is enrolled into the terminal. In addition, in the at least two fingerprint patterns displayed in the fingerprint enrollment interface, different fingerprint patterns have different overlapping areas with the fingerprint collection area. According to the method in this embodiment of this application, display positions of fingerprint patterns dynamically change to instruct the user to touch a fingerprint pattern, each of the dynamically changing fingerprint patterns at least partially overlap the fingerprint collection area of the touchscreen, and different fingerprint patterns have different overlapping areas with the fingerprint collection area. In this way, the user needs to touch only the displayed fingerprint pattern, so that the terminal can obtain fingerprint information at more angles and positions of the user, thereby improving fingerprint enrollment quality. In addition, in a fingerprint enrollment process, enrollment of the user does not need to be interrupted, and user learning is not required, thereby improving user experience.

It may be understood that, to implement the foregoing functions, the terminal includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

An embodiment of this application further provides a terminal for implementing the foregoing method embodiments. Specifically, function module division may be performed on the terminal. For example, each function module may be obtained through division corresponding to each function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 35:
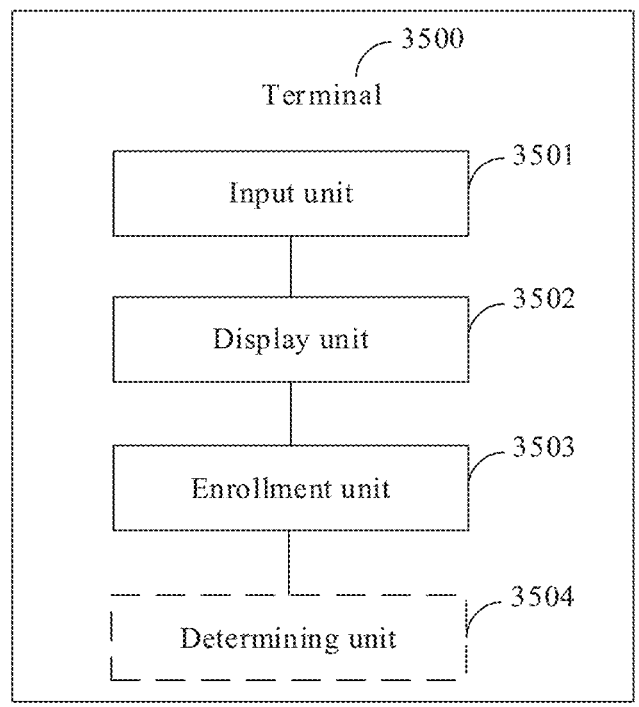
FIG. 35 is a schematic structural diagram of a terminal according to an embodiment of this application.

When each function module is obtained through division corresponding to each function, FIG. 35 is a possible schematic structural diagram of a terminal 3500 used in the foregoing embodiment. The terminal 3500 includes an input unit 3501, a display unit 3502, and an enrollment unit 3503.

The input unit 3501 is configured to receive an input of a user in a display interface of the terminal, for example, a touch input, a voice input, a gesture input, or a floating operation. The input unit 3501 is configured to support the terminal in performing S401 in the foregoing method embodiment, and/or used in another process of a technology described in this specification. The input unit may be a touchscreen, or other hardware, or a combination of hardware and software.

The display unit 3502 is configured to support the terminal in performing S402 in the foregoing method embodiment, displaying at least two fingerprint patterns in the fingerprint enrollment interface and instructing the user to touch a displayed fingerprint pattern in S403, and S404, and/or used in another process of a technology described in this specification.

The enrollment unit 3503 is configured to support the terminal in performing enrolling fingerprint information of the user when the user touches a display position of the fingerprint pattern in S403 in the foregoing method embodiment. A function of the enrollment unit may be alternatively performed by the input unit, or the enrollment unit serves as a subunit of the input unit. This is not limited in this embodiment. Specifically, the enrollment unit may be a fingerprint sensor (under a screen).

In this embodiment of this application, further, as shown in FIG. 35, the terminal 3500 further includes a determining unit 3504.

The determining unit 3504 is configured to support the terminal in performing a determining operation in the foregoing method embodiment, and may further be used in another process of a technology described in this specification. Specifically, the determining unit determines that a first input of a user is received, and instructs the display unit to display a fingerprint enrollment interface and display, in the fingerprint enrollment interface, at least two fingerprint patterns for instructing the user to touch. The determining unit further obtains fingerprint information of the user by using a fingerprint recognition device after determining that a fingerprint input is detected, to implement user fingerprint enrollment. The determining unit further instructs, based on a preset pattern display rule, or based on a preset pattern display rule and a fingerprint enrollment status, the display unit to update the fingerprint pattern. The determining unit may further determine, based on a preset rule, whether a currently enrolled fingerprint belongs to a left hand or a right hand, and instruct the display unit to display a corresponding fingerprint pattern of the left hand/right hand. The preset pattern display rule includes at least one of a position for displaying a pattern, duration, a sequence, a brightness, a contrast, a grayscale, and an animation effect.

For functional descriptions of the corresponding function modules, refer to all content related to the steps in the foregoing method embodiments. Details are not described herein again.

Certainly, the terminal includes but not is limited to the foregoing listed units and modules. For example, the terminal 3500 may further include a storage unit. The storage unit is configured to store data related to the terminal 3500, for example, a generated fingerprint template, enrolled fingerprint information, a preset pattern display rule, and a preset left/right hand determining rule. The terminal 3500 may further include a sending unit configured to send data or a signal to another device, a receiving unit configured to receive data or a signal sent by another device, or the like. In addition, functions that can be specifically implemented by the foregoing functional units also include but are not limited to functions corresponding to the method steps described in the foregoing embodiments. For detailed descriptions of other units of the terminal 3500, refer to the detailed descriptions of the method steps corresponding to the units. Details are not described again in this embodiment of this application.

Figure 36:
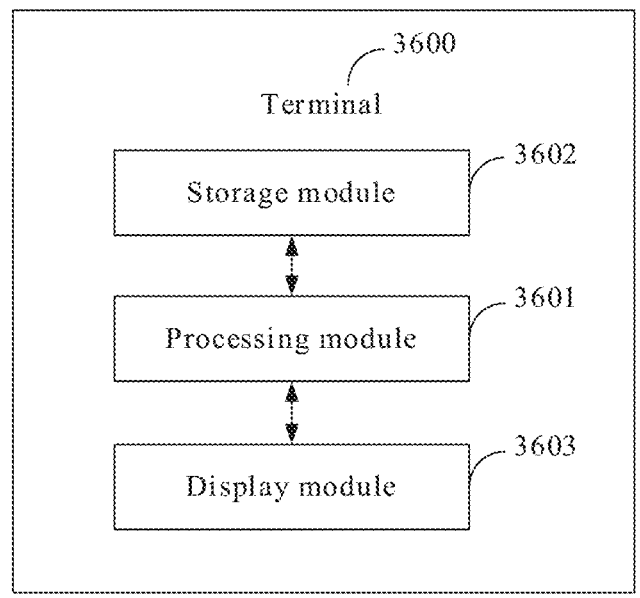
FIG. 36 is a schematic structural diagram of another terminal according to an embodiment of this application.

When an integrated unit is used, FIG. 36 is a possible schematic structural diagram of a terminal 3600 according to the foregoing embodiment. The terminal 3600 includes a processing module 3601, a storage module 3602, an input module, and a display module 3603. The processing module 3601 is configured to control and manage an action of the terminal 3600. The display module 3603 is configured to display content based on an instruction of the processing module 3601. The storage module 3602 is configured to store program code and data of the terminal 3600. The input module is configured to receive an input from other than the terminal, for example, a trigger input of a fingerprint enrollment function or a fingerprint input. Further, the terminal 3600 may further include a communications module. The communications module is configured to support the terminal 3600 in communicating with another network entity, to implement a function of the terminal such as a call, data interaction, or Internet access.

The processing module 3601 may be a processor or a controller. The communications module may be a transceiver, an RF circuit, a communications interface, or the like. The storage module 3602 may be a memory. The display module may be a screen or a display. The input module may be a touchscreen, a voice input apparatus, a fingerprint sensor, or the like.

When the processing module 3601 is a processor, the communications module is an RF circuit, the storage module 3602 is a memory, and the display module 3603 is a touchscreen, the terminal 3600 provided in this embodiment of this application may be the mobile phone shown in FIG. 3. The communications module may include not only an RF circuit, but also a Wi-Fi module, an NFC module, and a Bluetooth module. The communications modules such as the RF circuit, the NFC module, the Wi-Fi module, and the Bluetooth module may be collectively referred to as a communications interface. The processor, the RF circuit, the touchscreen, and the memory may be coupled together through a bus.

An embodiment of this application further provides a computer storage medium. The computer storage medium stores computer program code. When the processor executes the computer program code, the terminal performs the related method steps in FIG. 4 or FIG. 5 to implement the fingerprint enrollment method in the foregoing embodiment.

An embodiment of this application further provides a computer program product. When the computer program product is run on a computer, the computer is enabled to perform the related method steps in FIG. 4 or FIG. 5 to implement the fingerprint enrollment method in the foregoing embodiment.

An embodiment of this application further provides a control device. The control device includes a processor and a memory. The memory is configured to store computer program code. The computer program code includes a computer instruction. When the processor executes the computer instruction, the control device performs the related method steps in FIG. 4 or FIG. 5 to implement the fingerprint enrollment method in the foregoing embodiment. The control device may be an integrated circuit IC, or may be a system-on-a-chip SOC. The integrated circuit may be a general-purpose integrated circuit, or may be a field-programmable gate array FPGA, or may be an application-specific integrated circuit ASIC.

The terminal, the computer storage medium, the computer program product, and the control device provided in the embodiments of this application are all configured to perform the corresponding methods provided above. Therefore, for beneficial effects that can be achieved, refer to the beneficial effects in the corresponding methods provided above. Details are not described herein again.

The foregoing descriptions about implementations allow a person skilled in the art to understand that, for the purpose of convenient and brief description, division of the foregoing function modules is used as an example for illustration. During actual application, the foregoing functions can be allocated to different modules and implemented based on a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing is merely specific implementations of the embodiments of this application, but the protection scope of the embodiments of this application is not limited thereto. Any changes or replacements within the technical scope disclosed in the embodiments of this application should fall within the protection scope of the embodiments of this application. Therefore, the protection scope of the embodiments of this application shall be subject to the protection scope of the claims.

What is claimed is:

1. A fingerprint enrollment method implemented by a terminal comprising a touchscreen, wherein the fingerprint enrollment method comprises:
   receiving a first input of a user;
   displaying, in response to the first input, a fingerprint enrollment interface;
   displaying a first fingerprint pattern in the fingerprint enrollment interface wherein a center of the first fingerprint pattern overlaps a center of a fingerprint collection area;
   instructing the user to touch the first fingerprint pattern;
   enrolling first fingerprint information of the user when the user touches a second display position of the first fingerprint pattern;
   displaying a second fingerprint pattern in the fingerprint enrollment interface wherein a center of the second fingerprint pattern does not overlap the center of the fingerprint collection area;
   instructing the user to touch the second fingerprint pattern; and enrolling second fingerprint information of the user when the user touches a third display position of the second fingerprint pattern.

2. The fingerprint enrollment method of claim 1, further comprising updating the displayed fingerprint pattern in response to a touch input of the user at the first display position or in response to detecting that a fingerprint is successfully enrolled at the first display position.

3. The fingerprint enrollment method of claim 2, further comprising:
when the fingerprint patterns are simultaneously displayed in the fingerprint enrollment interface:
avoiding displaying a fingerprint pattern touched by the user in the fingerprint patterns; and
continuing to display all fingerprint patterns that are not touched by the user in the fingerprint patterns; and
when the fingerprint patterns are sequentially displayed in the fingerprint enrollment interface:
avoiding displaying a fingerprint pattern currently touched by the user; and
displaying a next fingerprint pattern of the fingerprint pattern currently touched by the user.

4. The fingerprint enrollment method of claim 1, wherein the third display position is located on a circular line or a cross line with the fingerprint collection area as a center.

5. The fingerprint enrollment method of claim 1, further comprising displaying the second fingerprint pattern in the fingerprint enrollment interface when:
a type of a finger used by the user to touch the displayed fingerprint pattern is a right thumb, wherein the third display position is located on a straight line that is based on a bottom right corner and a top left corner of the fingerprint collection area;
the type of the finger used by the user to touch the displayed fingerprint pattern is a left thumb, wherein the third display position is located on a straight line that is based on a top right corner and a bottom left corner of the fingerprint collection area;
the type of the finger used by the user to touch the displayed fingerprint pattern is an index finger, wherein the third display position is located on a vertical line passing through the center of the fingerprint collection area;
the user touches the displayed fingerprint pattern with a right hand, wherein the third display position is located on a left side of the vertical line; or
the user touches the displayed fingerprint pattern with a left hand, wherein the third display position is located on a right side of the vertical line.

6. The fingerprint enrollment method of claim 5, further comprising:
determining whether the user touches the displayed fingerprint pattern with the left hand or the right hand;
determining whether the user touches the displayed fingerprint pattern with the left hand or the right hand, and determining whether the type of the finger used by the user to touch the displayed fingerprint pattern is a thumb; or
determining whether the type of the finger used by the user to touch the displayed fingerprint pattern is the thumb, and determining whether the user touches the displayed fingerprint pattern with the left hand or the right hand.

7. The fingerprint enrollment method of claim 1, wherein before displaying the second fingerprint pattern in the fingerprint enrollment interface, and instructing the user to touch the displayed second fingerprint pattern, the fingerprint enrollment method further comprises:
determining a position of an unsuccessfully enrolled fingerprint based on the first fingerprint information; and
determining the third display position based on the position of the unsuccessfully enrolled fingerprint.

8. A terminal comprising:
a touchscreen;
a memory coupled to the touchscreen and configured to store a computer program code; and
a processor coupled to the touchscreen and the memory, wherein the computer program code causes the processor to be configured to:
receive a first input of a user;
display, in response to the first input, a fingerprint enrollment interface;
display a first fingerprint pattern in the fingerprint enrollment interface, wherein a center of the first fingerprint pattern overlaps a center of a fingerprint collection area;
instruct the user to touch the first fingerprint pattern;
enroll first fingerprint information of the user when the user touches a second display position of the first fingerprint pattern;
display a second fingerprint pattern in the fingerprint enrollment interface, wherein a center of the second fingerprint pattern does not overlap the center of the fingerprint collection area;
instruct the user to touch the second fingerprint pattern; and
enroll second fingerprint information of the user when the user touches a third display position of the second fingerprint pattern.

9. The terminal of claim 8, wherein the computer program code further causes the processor to be configured to update the displayed fingerprint pattern in response to a touch input of the user at the first display position, or in response to detecting that a fingerprint is successfully enrolled at the first display position.

10. The terminal of claim 8, wherein the third display position is located on a circular line or a cross line with the fingerprint collection area as a center.

11. The terminal of claim 8, wherein the computer program code further causes the processor to be configured to display the second fingerprint pattern in the fingerprint enrollment interface when at least one of the following:
a type of a finger used by the user to touch the displayed fingerprint pattern is a right thumb, wherein the third display position is located on a straight line that is based on a bottom right corner and a top left corner of the fingerprint collection area;
the type of the finger used by the user to touch the displayed fingerprint pattern is a left thumb, wherein the third display position is located on a straight line that is based on a top right corner and a bottom left corner of the fingerprint collection area;
the type of the finger used by the user to touch the displayed fingerprint pattern is an index finger, wherein the third display position is located on a vertical line passing through the center of the fingerprint collection area;
the user touches the displayed fingerprint pattern with a right hand, wherein the third display position is located on a left side of the vertical line; or the user touches the displayed fingerprint pattern with a left hand, wherein the third display position is located on a right side of the vertical line.

12. The terminal of claim 11, wherein the computer program code further causes the processor to be configured to:
determine whether the user touches the displayed fingerprint pattern with left hand or right hand;
determine whether the user touches the displayed fingerprint pattern with the left hand or the right hand, and determine whether the type of the finger used by the user to touch the displayed fingerprint pattern is a thumb; or
determine whether the type of the finger used by the user to touch the displayed fingerprint pattern is the thumb, and determine whether the user touches the displayed fingerprint pattern with the left hand or the right hand.

13. The terminal of claim 8, wherein the computer program code further causes the processor to be configured to:
when the fingerprint patterns are simultaneously displayed in the fingerprint enrollment interface:
avoid displaying a fingerprint pattern touched by the user in the fingerprint patterns; and
continue to display all fingerprint patterns that are not touched by the user in the fingerprint patterns; and
when the fingerprint patterns are sequentially displayed in the fingerprint enrollment interface:
avoid displaying a fingerprint pattern currently touched by the user; and
display a next fingerprint pattern of the fingerprint pattern currently touched by the user.

14. A computer program product comprising computer-executable instructions for storage on a non-transitory computer-readable medium that, when executed by a processor, cause a terminal comprising a touchscreen to:
receive a first input of a user;
display, in response to the first input, a fingerprint enrollment interface;
display a first fingerprint pattern in the fingerprint enrollment interface, wherein a center of the first fingerprint pattern overlaps a center of a fingerprint collection area;
instruct the user to touch the first fingerprint pattern;
enroll first fingerprint information of the user when the user touches a second display position of the first fingerprint pattern;
display a second fingerprint pattern in the fingerprint enrollment interface, wherein a center of the second fingerprint pattern does not overlap the center of the fingerprint collection area;
instruct the user to touch the second fingerprint pattern; and
enroll second fingerprint information of the user when the user touches a third display position of the second fingerprint pattern.

15. The computer program product of claim 14, wherein the computer-executable instructions further cause the terminal to update the displayed fingerprint pattern in response to a touch input of the user at the first display position, or in response to detecting that a fingerprint is successfully enrolled at the first display position.

16. The computer program product of claim 14, wherein the third display position is located on a circular line or a cross line with the fingerprint collection area as a center.

17. The computer program product of claim 14, wherein the computer-executable instructions further cause the terminal to display the second fingerprint pattern in the fingerprint enrollment interface when:
a type of a finger used by the user to touch the displayed fingerprint pattern is a right thumb, wherein the third display position is located on a straight line that is based on a bottom right corner and a top left corner of the fingerprint collection area;
the type of the finger used by the user to touch the displayed fingerprint pattern is a left thumb, wherein the third display position is located on a straight line that is based on a top right corner and a bottom left corner of the fingerprint collection area;
the type of the finger used by the user to touch the displayed fingerprint pattern is an index finger, wherein the third display position is located on a vertical line passing through the center of the fingerprint collection area;
the user touches the displayed fingerprint pattern with a right hand, wherein the third display position is located on a left side of the vertical line; or
the user touches the displayed fingerprint pattern with a left hand, wherein the third display position is located on a right side of the vertical line.

18. The computer program product of claim 17, wherein the computer-executable instructions further cause the terminal to:
determine whether the user touches the displayed fingerprint pattern with left hand or right hand;
determine whether the user touches the displayed fingerprint pattern with the left hand or the right hand, and determine whether the type of the finger used by the user to touch the displayed fingerprint pattern is a thumb; or
determine whether the type of the finger used by the user to touch the displayed fingerprint pattern is the thumb, and determine whether the user touches the displayed fingerprint pattern with the left hand or the right hand.

19. The computer program product of claim 14, wherein the computer-executable instructions further cause the terminal to, before displaying the second fingerprint pattern in the fingerprint enrollment interface, and instructing the user to touch the displayed second fingerprint pattern:
determine a position of an unsuccessfully enrolled fingerprint based on the first fingerprint information; and
determine the third display position based on the position of the unsuccessfully enrolled fingerprint.

20. The computer program product of claim 14, wherein the computer-executable instructions further cause the terminal to:
when the fingerprint patterns are simultaneously displayed in the fingerprint enrollment interface:
avoid displaying a fingerprint pattern touched by the user in the fingerprint patterns; and
continue to display all fingerprint patterns that are not touched by the user in the fingerprint patterns; and
when the fingerprint patterns are sequentially displayed in the fingerprint enrollment interface:
avoid displaying a fingerprint pattern currently touched by the user; and
display a next fingerprint pattern of the fingerprint pattern currently touched by the user.

* * * * *